United States Patent
Goswami et al.

(10) Patent No.: US 12,194,439 B1
(45) Date of Patent: Jan. 14, 2025

(54) METHODS FOR OPTIMIZING A TRANSMITTANCE AND/OR A SELF-CLEANING PROPERTY OF A SUBSTRATE USING A SELF-CLEANING COATING

(71) Applicant: University of South Florida, Tampa, FL (US)

(72) Inventors: Dharendra Yogi Goswami, Tampa, FL (US); Mohammed Khaleel M. Alhussain, Tampa, FL (US)

(73) Assignee: University of South Florida, Tampa, FL (US)

( * ) Notice: Subject to any disclaimer, the term of this patent is extended or adjusted under 35 U.S.C. 154(b) by 145 days.

(21) Appl. No.: 17/840,189

(22) Filed: Jun. 14, 2022

Related U.S. Application Data

(60) Provisional application No. 63/202,498, filed on Jun. 14, 2021.

(51) Int. Cl.
*B05D 5/00* (2006.01)
*B01J 21/06* (2006.01)
(Continued)

(52) U.S. Cl.
CPC ............. *B01J 21/063* (2013.01); *B01J 21/08* (2013.01); *B01J 35/39* (2024.01); *B01J 37/0219* (2013.01);
(Continued)

(58) Field of Classification Search
CPC . B01J 21/063; B01J 21/08; B01J 35/39; B01J 37/0219; B01J 37/0228; B01J 37/0244; B01J 37/04
See application file for complete search history.

(56) References Cited

U.S. PATENT DOCUMENTS

| | | | |
|---|---|---|---|
| 2005/0009953 A1* | 1/2005 | Shea ..................... | C08L 83/04 428/428 |
| 2006/0008589 A1* | 1/2006 | Lin ......................... | B01J 37/06 427/299 |

(Continued)

OTHER PUBLICATIONS

Issa et al. "Kinetics of Alkoxysilanes and Organoalkoxysilanes Polymerization: A Review". Polymers 2019, 11, 537, pp. 1-41. (Year: 2019).*

(Continued)

*Primary Examiner* — Alexander M Weddle
(74) *Attorney, Agent, or Firm* — Owen G. Behrens; Smith & Hopen, P.A.

(57) ABSTRACT

Described herein relates to methods for optimizing a transmittance and/or a self-cleaning property of a substrate using a self-cleaning coating. As such, the substrate may be treated using a photocatalytic reaction of titanium dioxide (hereinafter "$TiO_2$")-based solution via a light treatment. The substrate may be treated using a combination including but not limited to wet chemicals, dry-cleaning, and/or mechanical polishing. Additionally, the substrate may then be overlayed with a self-cleaning coating, such that the transmittance and the self-cleaning properties of the substrate may be optimized. Furthermore, the methods for optimizing the transmittance and/or the self-cleaning functionality of the substrate may also enhance self-cleaning, anti-fouling, anti-fogging, anti-icing characteristics of the substrate.

5 Claims, 17 Drawing Sheets

(51) Int. Cl.
| | |
|---|---|
| *B01J 21/08* | (2006.01) |
| *B01J 31/38* | (2006.01) |
| *B01J 35/39* | (2024.01) |
| *B01J 37/02* | (2006.01) |
| *B01J 37/04* | (2006.01) |
| *B05D 3/00* | (2006.01) |

(52) U.S. Cl.
CPC ....... *B01J 37/0228* (2013.01); *B01J 37/0244* (2013.01); *B01J 37/04* (2013.01)

(56) References Cited

U.S. PATENT DOCUMENTS

| | | | |
|---|---|---|---|
| 2013/0196845 A1* | 8/2013 | Jirkovsky | B01J 35/39 502/232 |
| 2016/0002498 A1* | 1/2016 | Maghsoodi | C09D 5/1662 428/313.9 |
| 2017/0225195 A1 | 8/2017 | Matin et al. | |
| 2020/0086346 A1 | 3/2020 | Kobrin et al. | |

OTHER PUBLICATIONS

Sonia Amigoni et al. "Covalent Layer-by-Layer Assembled Superhydrophobic Organic-Inorganic Hybrid Films," Langmuir Article, Jul. 14, 2009. pp. 11073-11077.

Askari Mohammad Bagher et al. "Types of Solar Cells and Application" American Journal of Optics and Photonics, Aug. 21, 2015. vol. 3, No. 5, pp. 94-113.

A. Bake et al. "Preparation of transparent and robust superhydrophobic surfaces for self-cleaning applications," Progress in Organic Coatings. May 10, 2018, vol. 122, pp. 170-179.

Swagata Banerjee et al. "Self-cleaning applications of TiO2 by photo-induced hydrophilicity and photocatalysis," Applied Catalysis B: Environmental, 2015, 176-177, pp. 396-428.

Swagata Banerjee et al. "New Insights into the Mechanism of Visible Light Photocatalysis," The Journal of Physical Chemistry Letters, Jul. 10, 2014, pp. 2543-2554.

Shantanu Bhattacharya et al. "Studies on Surface Wettability of Poly(Dimethyl) Siloxane (PDMS) and Glass Under Oxygen-Plasma Treatment and Correlation With Bond Strength" Journal of Microelectromechanical Systems, Jun. 2005, vol. 14, No. 3, pp. 590-597.

Bharat Bhushan et al. "Natural and biomimetic artificial surfaces for superhydrophobicity, self-cleaning, low adhesion, and drag reduction," Progress in Materials Science, 2011, vol. 56, pp. 1-108.

Bharat Bhushan et al. "Wetting study of patterned surfaces for superhydrophobicity," Ultramicroscopy, 2007, vol. 107, pp. 1033-1041.

Duc-Nguyen Bui et al. "Effect of Si doping on the photocatalytic activity and photoelectrochemical property of TiO2 nanoparticles," Catalysis Communications, Jun. 2011. vol. 13, pp. 14-17.

Wei Chen et al. "Ultrahydrophobic and Ultralyophobic Surfaces: Some Comments and Examples," Langmuir, Apr. 4, 1999, vol. 15, No. 10, pp. 3395-3399.

Taeseok Choi et al. "Transparent nitrogen doped TiO2/WO3 composite films for self-cleaning glass applications with Improved photodegradation activity" Advanced Powder Technology, Jan. 14, 2016, vol. 27, pp. 347-353.

Tania Dey et al. "Cleaning and anti-reflective (AR) hydrophobic coating of glass surface: a review from materials science perspective," J Sol-Gel Sci Technol. 2016, vol. 77, pp. 1-27.

D.H. Flinn et al. "Characterization of silica surfaces hydrophobized by octadecyltrichlorosilane," Colloids and Surfaces, A: Physicochemical and Engineering Aspects, 1994, vol. 87, pp. 163-176.

Akira Fujishima et al. "Electrochemical Photolysis of Water at a Semiconductor Electrode," Nature, Jul. 7, 1972, vol. 238, pp. 37-38.

Li Gang, "Superhydrophobicity of Post-like Aligned Carbon Nanotube Films," Proceedings of SPIE. Sixth International Symposium on Precision Engineering Measurements and Instrumentation, Dec. 28, 2010. vol. 7544, pp. 1-7. SPIEDigitalLibrary.org/conference-proceedings-of-spie.

N. De Geyter et al. "Cold plasma surface modification of biodegradable polymer biomaterials," Cold plasma surface modification, 2014, pp. 202-223.

G. Grundmeier et al. "Tailoring of the morphology and chemical composition of thin organosilane microwave plasma polymer layers on metal substrates," Thin Solid Films, 2004, vol. 446, pp. 61-71.

Kang-Soo Han et al. "Enhanced performance of solar cells with anti-reflection layer fabricated by nano-imprint lithography," Solar Energy Materials & Solar Cells, 2011, vol. 95, pp. 288-291.

Kang-Soo Han et al. "Enhanced transmittance of glass plates for solar cells using nano-imprint lithography," Solar Energy Materials & Solar Cells, 2010, vol. 94, pp. 583-587.

Y. Han et al. "Surface activation of thin silicon oxides by wet cleaning and silanization," Thin Solid Films, Apr. 2006, vol. 510, pp. 175-180.

Mark N. Horenstein et al. "Modeling of Trajectories in an Electrodynamic Screen for Obtaining Maximum Particle Removal Efficiency," IEEE Transactions on Industry Applications, Mar./Apr. 2013, vol. 49, No. 2, pp. 707-713.

Benjamin P. Isaacoff et al. "Progress in Top-Down Control of Bottom-Up Assembly," Nano Letters, Oct. 20, 2017, vol. 17, pp. 6508-6510.

Ahmed A. Issa et al. "Kinetics of Alkoxysilanes and Organoalkoxysilanes Polymerization: A Review," Polymers, Mar. 21, 2019. pp. 1-41.

Chul Han Kwon et al. "Preparation and characterization of TiO2—SiO2 nano-composite thin films," Ceramics International, Jun. 2003, vol. 29, pp. 851-856.

Yang Li et al. "A facile layer-by-layer deposition process for the fabrication of highly transparent superhydrophobic coatings," ChemComm, Mar. 2009, pp. 2730-2732.

Huan Liu et al. "Reversible Wettability of a Chemical Vapor Deposition Prepared ZnO Film between Superhydrophobicity and Superhydrophilicity" Langmuir, Jun. 2, 2004, vol. 20, No. 14, pp. 5659-5661.

Umer Mehmood et al. "Superhydrophobic surfaces with antireflection properties for solar applications: A critical review," Solar Energy Materials & Solar Cells, 2016. vol. 157, pp. 604-623.

On-Uma Nimittrakoolchai et al. "Deposition of organic-based superhydrophobic films for anti-adhesion and self-cleaning applications," Journal of the European Ceramic Society, 2008, vol. 28, pp. 947-952.

Sanjay S. Latthe et al. "Self-cleaning superhydrophobic coatings: Potential industrial applications," Progress in Organic Coatings, 2019, vol. 128, pp. 52-58.

Srijita Nundy et al. "Hydrophilic and Superhydrophilic Self-Cleaning Coatings by Morphologically Varying ZnO Microstructures for Photovoltaic and Glazing Applications," ACS Omega, Jan. 8, 2020, vol. 5, pp. 1033-1039.

S. Sutha et al. "Transparent alumina based superhydrophobic self-cleaning coatings for solar cell cover glass applications," Solar Energy Materials & Solar Cells, 2017, vol. 165, pp. 128-137.

Hong Zhong et al. "TiO2/silane coupling agent composed of two layers structure: A super-hydrophilic self-cleaning coating applied in PV panels," Applied Energy, 2017. vol. 204, pp. 932-938.

Fernando Pacheco Torgal et al. Biotechnologies and Biomimetics for Civil Engineering, 2015, pp. 1-441.

P.A. Patil et al. "A Review on Cleaning Mechanism of Solar Photovoltaic Panel," International Conference on Energy, Communication, Data Analytics and Soft Computing. 2017, pp. 250-256.

Miguel Pelaez et al. "A review on the visible light active titanium dioxide photocatalysts for environmental applications," Applied Catalysis B: Environmental, 2012. vol. 125, pp. 331-349.

A. Venkateswara Rao et al. "Water repellent porous silica films by sol-gel dip coating method," Journal of Colloid and Interface Science, 2010. vol. 352, pp. 30-35.

Hemant Kumar Raut et al. "Anti-reflective coatings: A critical, in-depth review," Energy & Environmental Science, 2011, vol. 4, pp. 3779-3804.

(56) References Cited

OTHER PUBLICATIONS

Rong Wang et al. "Light-induced amphiphilic surfaces," Nature, Jul. 1997, vol. 388, pp. 431-432.
Tamar Saison et al. "Replication of butterfly wing and natural lotus leaf nanostructures by nanoimprint on Silica Sol-gel films." Bioinspiration & Biomimetics, Oct. 2008, pp. 1-3.
A.A.M. Sayigh. "Effect of Dust on Flat Plate Collectors," In: Sun: Mankind's future source of energy; Proceedings of the International Solar Energy Congress, New Delhi, India, Jan. 16-21, 1978. vol. 2, pp. 960-964.
H.M. Shang et al. "Optically transparent superhydrophobic silica-based films," Thin Solid Films. 2005, vol. 472, pp. 37-43.
Shaoxian et al. "Vapor-condensed gas lubrication of face seals," Gas Thermo-hydrodynamic Lubrication and Seals. 2019, pp. 143-164. DOI: https://doi.org/10.1016/B978-0-12-816716-8.00007-3.
Jau-Ye Shiu et al. "Fabrication of Tunable Superhydrophobic Surfaces by Nanosphere Lithography," Chemistry of Materials, Feb. 24, 2004, vol. 16, No. 4, pp. 561-564.
Manhui Sun et al. "Artificial Lotus Leaf by Nanocasting," Langmuir. Aug. 16, 2005, vol. 21, No. 19, pp. 8978-8981.
A. Syafiq et al. "Advances in approaches and methods for self-cleaning of solar photovoltaic panels," Solar Energy. 2018, vol. 162, pp. 597-619.
A. Venkateswara Rao et al. "Preparation of MTMS based transparent superhydrophobic silica films by sol-gel method," Journal of Colloid and Interface Science, 2009, vol. 332, pp. 484-490.
Ping Wang et al. "Reducing the effect of dust deposition on the generating efficiency of solar PV modules by super-hydrophobic films," Solar Energy, 2018. vol. 169, pp. 277-283.
Robert N. Wenzel. "Communication to the Editor Surface Roughness and Contact Angle," New Books. Oct. 25, 1949. pp. 1466-1467.
Limin Wu et al. Functional Polymer Coatings Principles, Methods, and Applications. 2015, pp. 1-370.
Toshiaki Yamamoto et al. "Improvement on Hydrophilic and Hydrophobic Properties of Glass Surface Treated by Nonthermal Plasma Induced by Silent Corona Discharge," Plasma Chemistry and Plasma Processing, Mar. 2004, vol. 24, No. 1, pp. 1-12.
Zhiqing Yuan et al. "Facile method to prepare a novel honeycomb-like superhydrophobic Polydimethylsiloxan surface," Surface & Coatings Technology. 2010, vol. 205, pp. 1947-1952.
Liang Zhang et al. "Fabrication and application of superhydrophilic surfaces: a review," Journal of Adhesion Science and Technology. 2014, vol. 28, Nos. 8-9, pp. 769-790.
Wei Zhao et al. "Efficient Degradation of Toxic Organic Pollutants with Ni2O3/TiO2-xBx under Visible Irradiation," J. Am. Chem. Soc. Mar. 26, 2004, vol. 126, pp. 4782-4783.
Yan Zhao et al. "Superhydrophobic Polyimide Films with a Hierarchical Topography: Combined Replica Molding and Layer-by-Layer Assembly," Langmuir. Oct. 10, 2008. vol. 24, No. 21, pp. 12651-12657.
Adams et al. "Lunar dust degradation effects and removal/ prevention concepts" Final Report, vol. II—Detailed Results, Northrop/Huntsville Technical Report No. 323, Jun. 7, 1967. pp. 1-206.
Pattillo "Fast Facts," 1990-2017 National-Level U.S. Greenhouse Gas Inventory. Apr. 2019. United States Environmental Protection Agency.

* cited by examiner

METHODS FOR OPTIMIZING A TRANSMITTANCE AND/OR A SELF-CLEANING PROPERTY OF A SUBSTRATE USING A SELF-CLEANING COATING

CROSS-REFERENCE TO RELATED APPLICATIONS

This nonprovisional application claims the benefit of U.S. Provisional Application No. 63/202,498 entitled "METHOD OF PREPARING A SURFACE USING $TiO_2$-UVA TREATMENT AND FABRICATING SELF-CLEANING COATING," filed Jun. 14, 2021 by the same inventors, all of which is incorporated herein by reference in its entirety.

BACKGROUND OF THE INVENTION

1. Field of the Invention

This invention relates, generally, to cleaning solutions. More specifically, the invention pertains to methods for optimizing a transmittance and/or a self-cleaning property of a substrate using a self-cleaning coating.

2. Brief Description of the Prior Art

The continuous dramatic increase in the world population with the industrial revolution and technological advancement has led to an increasing demand for food, transportation, and energy. Meeting this growing demand leads to an increase in greenhouse gas emissions in the atmosphere, which is one of the major causes of climate change. According to the United States Environmental Protection Agency (EPA), carbon dioxide ($CO_2$) is the primary source of greenhouse gases emitted through human activities. In the U.S. in 2017, transportation contributed approximately 36% to $CO_2$ emissions from fossil fuel combustion while electric power contributed 35%, and the industrial sector 17%; 12% came from other sources. To overcome these challenges and meet the growing energy demand, consumption of fossil fuel a shift to clean and renewable energy sources as been steadily increasing.

Over the past few years, growing global interest has led to an increase in research in the development of sustainable energy sources such as wind, solar, biomass and hydroelectric energy. Solar is one of the most promising and abundant sources of energy, and solar photovoltaic (hereinafter "PV") has seen accelerated use due to a dramatic decline in the manufacturing and installation costs. A key focus of this new research is on increasing the efficiency of solar panels. However, maintaining this efficiency while in use is an area of concern. One of the most challenging issues in maintaining the efficiency of the PV modules is the dust and grime deposition on the panel protective glass cover, especially in desert, polluted, or industrial areas, such as a PV power station.

This problem of dust deposition not only reduces power production from the panels but has also increased the operation and maintenance costs due to the need for frequent cleaning, which also results in deterioration to the panel lifetime due to scrubbing and using cleaning detergents. It was shown that a flat plate collector's efficiency dropped in Riyadh City desert areas 11% after three days. Additionally, research was conducted, and it was found that the loss in PV panels' efficiency in Egypt desert areas after six months was roughly 66%. That results in lowering the economic feasibility of the panels, especially for large scale power plants. To solve this issue, scientists and researchers have been constantly seeking efficient and cost-effective ways to reduce the dust and grime deposition and prevent them from sticking to the panels to keep them clean.

Recent advances in self-cleaning coatings have enabled the use of hydrophobic and hydrophilic behaviors on solar panels and other glass modules. However, currently known self-cleaning coatings using this technology—such as the one disclosed in U.S. Pat. No. 10,150,140 (issued Dec. 11, 2018)—require the inclusion of octadecyltrichlorosilane in the solution, such that octadecyltrichlorosilane is deposited on the substrate's surface and coated to it via surface hydroxyl groups. Accordingly, applications of such self-cleaning coatings are limited to solutions that are chemically stable with octadecyltrichlorosilane. In addition, these self-cleaning coatings are limited to solar panels and glass modules, only. Thus, currently known self-cleaning coatings are non-consistent and irregular as coating processes involving octadecyltrichlorosilane (OTS) self-assembled monolayers are known to be highly irreproducible due to the bulk hydrolysis reaction with the release of Cl, forming aggregates of siloxane (Si—O—Si) bonded networks, while also being limited to solar panels and glass modules.

Accordingly, what is needed is a stable, efficient, self-cleaning coating which enhances a transmittance and/or a self-cleaning property of a substrate. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. An aspect of the present disclosure pertains to a method of preparing a substrate for a self-cleaning coating. In an embodiment the method may comprise the following steps: (a) introducing at least one Titanium-dioxide (hereinafter "$TiO_2$") molecule into an aqueous solution; (b) homogenizing the at least one $TiO_2$ molecule within the aqueous solution to form a colloidal $TiO_2$ solution; (c) disposing the substrate in the colloidal $TiO_2$ solution, such that the substrate may have at least one $TiO_2$ nanoparticle disposed upon at least one surface of the substrate; (d) exposing the substrate having at least one $TiO_2$ nanoparticle disposed upon at least one surface of the substrate to a light treatment, such that the at least one surface of the substrate may undergo a photocatalytic reaction, which may remove at least one impairment from the at least one surface of the substrate; (e) cleansing the substrate, such that the at least one $TiO_2$ molecule may be removed from the at least one surface of the substrate; and (f) incorporating a thin-film coating on the at least one surface of the substrate, such that the thin-film coating may comprise a predetermined ratio of a total amount of a silica precursor to a total amount of a non-neutral pH medium, which may enhance a self-cleaning property of the at least one surface of the substrate.

Moreover, in this embodiment, the method may further comprise the step of, after immersing the substrate in the colloidal $TiO_2$ solution, rinsing the substrate, via an aqueous solution. In some embodiments, a low-lint, low-extractable wipe may be used to cleanse the substrate. In this manner, in these other embodiments, method may further comprise the step of, after cleaning the substrate, drying the substrate, via a pressurized gas. In addition, sonication may also be used to homogenize the at least one TiO$_2$ molecule within the aqueous solution.

Another aspect of the present disclosure pertains to a method of synthesizing a self-cleaning coating. In an embodiment the method may comprise the following steps: (a) introducing at least one silica precursor into a solution comprising at least one water molecule in the non-neutral pH medium; (b) hydrolyzing the at least one silica precursor, via collision, with the at least one water molecule in the non-neutral pH medium, forming at least one non-methylated silica precursor; (c) condensing the at least one silanol group of the non-methylated silica precursor, such that at least on silsesquioxane which has at least one siloxane bond may be formed; and (d) curing the at least one silsesquioxane compound.

In some embodiments, a heat treatment may be used to cure the silsesquioxane compound to the substrate. Furthermore, in these other embodiments, sonication may also be used to hydrolyze the at least one silica precursor. As such, the silsesquioxane compound may hydrophobic.

In some embodiments, the method may further comprise the step of, after hydrolyzing the at least one silica precursor, introducing additional non-neutral pH medium, such that a predetermined ratio of a total amount of silica precursor to a total amount of non-neutral pH medium may be reached, which may enhance a transmittance and/or hydrophobicity of the at least one silsesquioxane compound.

Additionally, another aspect of the present disclosure pertains to a method of optimizing at least one self-cleaning property of a substrate. In an embodiment, the method may comprise the following step: (a) incorporating a self-cleaning coating on a surface of the substrate, the self-cleaning coating comprising: (1) a solution comprising at least one water molecule in a non-neutral pH medium; and (2) at least one silica precursor, such that the at least one silica precursor may chemically react with the at least one water molecule in the non-neutral pH medium. Accordingly, at least one methanol molecule may be removed from the at least one silica precursor, forming at least one non-methylated silica precursor having at least one silanol group. In addition, in this embodiment the at least one silanol group of the at least one non-methylated silica precursor may be condensed, such that at least one silsesquioxane having at least one siloxane bonds may be formed. Accordingly, the incorporation of the self-cleaning coating to the substrate thereof may optimize at least one self-cleaning property of the substrate.

In some embodiments, the method may further comprise the steps of: before incorporating the self-cleaning coating on the surface of the substrate, (i) introducing at least one Titanium-dioxide (hereinafter "TiO$_2$") molecule into an aqueous solution; (ii) homogenizing the at least one TiO$_2$ molecule within the aqueous solution to form a colloidal TiO$_2$ solution; (iii) disposing the substrate in the colloidal TiO$_2$ solution, such that the substrate may have at least one TiO$_2$ nanoparticle disposed upon at least one surface of the substrate; (iv) exposing the substrate having at least one TiO$_2$ nanoparticle disposed upon at least one surface of the substrate to a light treatment, such that the at least one surface of the substrate undergoes a photocatalytic reaction, which may remove at least one impairment from the at least one surface of the substrate; and (v) cleansing the substrate, such that the at least one TiO$_2$ molecule may be removed from the at least one surface of the substrate. Additionally, in some embodiments, the self-cleaning coating may comprise a ratio of a total amount of silica precursor to a total amount of non-neutral pH medium of at least 1:60 for this aspect of the present disclosure. As such, in these other embodiments, the WCA measurement of the substrate having a self-cleaning coating incorporated on at least one surface of the substrate may comprise at least 85°.

In order to further incorporate the self-cleaning coating to the substrate, in some embodiments, the method may further comprise the step of, before incorporating the self-cleaning coating on the surface of the substrate, etching at least one surface of the substrate, such that the surface roughness of the at least one surface of the substrate is increased. As such, the at least one self-cleaning property of the substrate may be enhanced, accordingly.

Further, another aspect of the present disclosure pertains to a method of optimizing a transmittance of a substrate. In an embodiment, the method may comprise the following step: (a) incorporating a self-cleaning coating on a surface of the substrate, the self-cleaning coating comprising: (1) a solution comprising at least one water molecule in a non-neutral pH medium; and (2) at least one silica precursor, such that the at least one silica precursor may chemically react with the at least one water molecule in the non-neutral pH medium. Accordingly, at least one methanol molecule may be removed from the at least one silica precursor, forming at least one non-methylated silica precursor having at least one silanol group. In addition, in this embodiment the at least one silanol group of the at least one non-methylated silica precursor may be condensed, such that at least one silsesquioxane having at least one siloxane bonds may be formed. Accordingly, the incorporation of the self-cleaning coating to the substrate thereof may optimize the transmittance of the substrate.

Additionally, in some embodiments, the method may further comprise the steps of: before incorporating the self-cleaning coating on the surface of the substrate before incorporating the self-cleaning coating on the surface of the substrate, (i) introducing at least one Titanium-dioxide (hereinafter "TiO$_2$") molecule into an aqueous solution; (ii) homogenizing the at least one TiO$_2$ molecule within the aqueous solution to form a colloidal TiO$_2$ solution; (iii) disposing the substrate in the colloidal TiO$_2$ solution, such that the substrate may have at least one TiO$_2$ nanoparticle disposed upon at least one surface of the substrate; (iv) exposing the substrate having at least one TiO$_2$ nanoparticle disposed upon at least one surface of the substrate to a light treatment, such that the at least one surface of the substrate undergoes a photocatalytic reaction, which may remove at least one impairment from the at least one surface of the substrate; and (v) cleansing the substrate, such that the at least one TiO$_2$ molecule may be removed from the at least one surface of the substrate. Additionally, in some embodiments, the self-cleaning coating may comprise a ratio of a total amount of silica precursor to a total amount of non-neutral pH medium of at least 1:60 for this aspect of the present disclosure. As such, in these other embodiments, the transmittance of the substrate having a self-cleaning coating incorporated on at least one surface of the substrate may comprise at least 90%.

In order to further incorporate the self-cleaning coating to the substrate, in some embodiments, the method may further comprise the step of, before incorporating the self-cleaning coating on the surface of the substrate, etching at least one surface of the substrate, such that the surface roughness of the at least one surface of the substrate is increased. As such, the transmittance of the substrate may be increased, accordingly.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
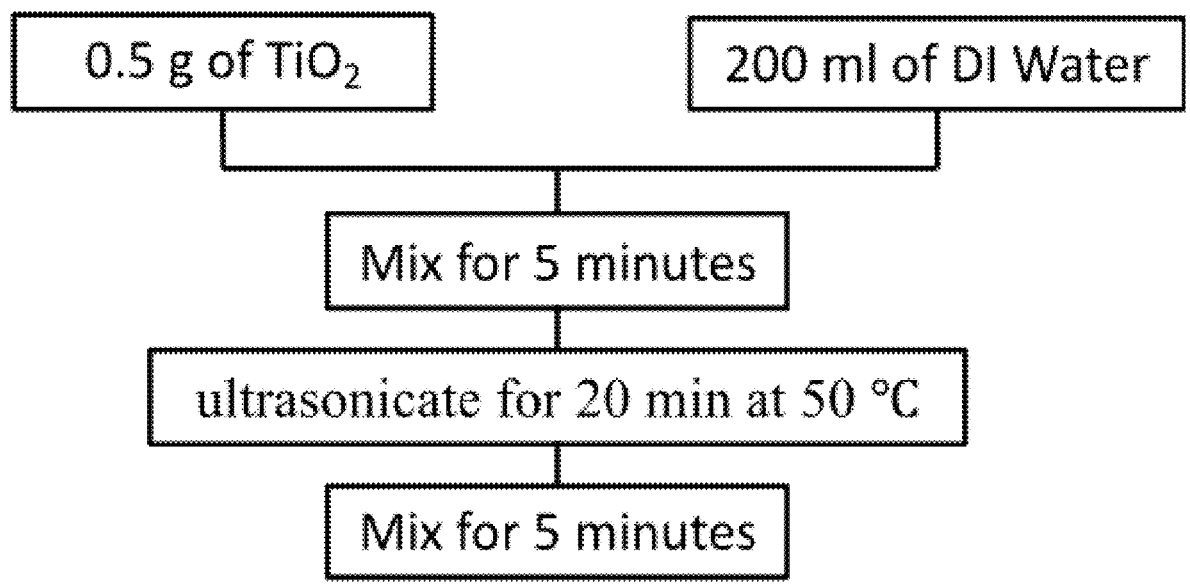
FIG. 1 is an exemplary flowchart depicting the steps of a method for preparing a cleaning solution, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification of for illustration and should not be construed as limiting.

Reference in the specification to "one embodiment," "preferred embodiment," "an embodiment." or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments." "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The administration of the cleaning coating may be extended over an extended period of time, such as from about a month or shorter up to about three years or longer. For example, the administration regimen can be extended over a period of any of about 2, 3, 4, 5, 6, 7, 8, 9, 10, 11, 12, 18, 24, 30, and 36 seconds, minutes, hours, days, weeks, months, or any time known in the art for effectively administrating a cleaning coating to a surface. In some embodiments, there is no break in the administrating schedule. In some embodiments, the interval between each administration is no more than about a week.

As used herein, "substrate" refers to any material known in the art in which a self-cleaning coating may be applied. The substrate may be a window, a roof tile, microscope slide, a windshield, a gutter, a computing device, an outdoor television, an electrical device, a tempered glass, and/or a solar panel. For ease of reference, the exemplary embodiment, described herein, refers to a solar panel and/or a roof tile, but this description should not be interpreted as exclusionary of other substrates.

As used herein, the term "silica precursor" refers to any molecule known in the art in which comprises at least one silicone dioxide. For ease of reference, the exemplary embodiment, described herein, refers to Methyltrimethoxysilane (hereinafter "MTMS"), but this description should not be interpreted as exclusionary of other silica precursors.

As used herein, the term "catalyst" refers to any acidic or basic molecule known in the art which may initiate and/or enhance a reaction between the silica precursor and at least one water molecule within the non-neutral pH medium. For ease of discussion, the exemplary embodiment described herein refers to hydrochloric acid (hereinafter "HCL"), but this description should not be interpreted as exclusionary of other acidic or basic molecules.

As used herein, the term "silica film" refers to any film known in the art which comprises at least one silicone molecule. The silica film may be a hydrophobic film and/or a hydrophilic film. For ease of reference, the exemplary embodiment, described herein, refers to a hydrophobic silica film, but this description should not be interpreted as exclusionary of other films comprising at least one silicone molecule.

As used herein, "wet chemical" refers to any solution known in the art which may clean a surface. The wet chemical may be an organic solvent, acid, and/or base at different concentrations, times, and temperatures. For ease of reference, the exemplary embodiment, described herein, refers to an organic solvent, but this description should not be interpreted as exclusionary of other wet chemicals.

As used herein, "dry-cleaning" refers to any surface treatment known in the art which uses a photocatalytic reaction to remove particles from the surface. The dry-cleaning may comprise oxygen plasma, UV-ozone, pyrolysis, ultrasonic cleaning, and laser treatment. For ease of reference, the exemplary embodiment, described herein, refers to comprises UV-ozone, but this description should not be interpreted as exclusionary of other dry-cleanings.

As used herein, the term "predetermined speed" refers to any speed known in the art in which a silica precursor and at least one water molecule may react in a non-neutral pH medium in order to create a homogenous solution. For ease of reference, the exemplary embodiment, described herein, refers to a moderate speed, as known in the art, but this description should not be interpreted as exclusionary of other mixing speeds.

As used herein, the term "light treatment" refers to any treatment known in the art in which a light is used to facilitate a photocatalytic reaction of at least one $TiO_2$ nanoparticle and/or a $TiO_2$ nanoparticle solution. The light treatment may comprise exposure to ultraviolet light, exposure to visible light, and infrared light. For ease of reference, the exemplary embodiment, described herein, refers to the exposure of ultraviolet light and/or visible light, but this description should not be interpreted as exclusionary of other light treatments.

As used herein, the term "overlay method" refers to any method known in the art in which a coating may be disposed upon a surface of a substrate. The overlay method may comprise layering, dipping, glazing, blanketing, smearing, and/or swathing. For ease of reference, the exemplary embodiment, described herein, refers to a dipping method, but this description should not be exclusionary of other methods in which a coating is disposed upon the surface of the substrate.

As used herein, "atomic force microscopy (hereinafter "AFM")" refers to a high-resolution measuring and imaging technique of the surface topography and characteristics of a substrate. It may comprise a small cantilever with a nano-sized tip at the end to scan the substrate surface and generate images. The topographical images may be generated with atomic resolution by a position-sensitive detector that detects a laser beam reflected from the cantilever. The AFM topographical data and imaging may be carried out using Dimension 3100 atomic force microscopy. AFM may be used to measure the surface roughness and to understand the wettability change with the change in surface roughness.

As used herein, "Scanning Electron Microscopy (hereinafter "SEM")" refers to image technique used to characterize the morphology and microstructure of the deposited thin films on the substrates. SEM images may be taken using a field emission scanning electron microscope (FE-SEM) with an accelerating voltage of 25 kV. The SEM may be capable of taking images at a magnification up to 250,000 times the actual size. The image is generated by scanning a small diameter electron beam over the specimen. The electrons may be scattered from the surface, which then may be collected by a detector to generate an image. The substrate and the coating material encompassing the substrate may be non-conductive. Therefore, the substrate and coating material may be coated with an ultra-thin layer of gold-palladium to prevent electron charging.

As used herein, "UV visible spectrophotometry" refers to a technique used to measure the amount of light absorbed, transmitted, and reflected across the ultraviolet and visible range of the electromagnetic spectrum. It may measure the intensity of light passing through the substrate compared to a reference uncoated substrate. The UV visible spectrophotometry may be used to measure the light transmittance through the coated substrates.

As used herein, "about" means approximately or nearly and in the context of a numerical value or range set forth means ±15% of the numerical.

All numerical designations, such as pH, temperature, time, concentration, and molecular weight, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of one or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of one or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Substrate Preparation:

The present disclosure pertains to a composition of and a method for preparing a surface with a self-cleaning coating. In an embodiment, a surface may be treated using a combination of at least a wet chemical and dry-cleaning. For example, the surface treatment may comprise a photocatalytic reaction of titanium dioxide (hereinafter "$TiO_2$")-based solution via a light treatment. In some embodiments, the surface may be treated using a combination including but not limited to wet chemicals, dry-cleaning, mechanical polishing, and/or any surface cleaning method known in the art.

FIG. 1 depicts an exemplary flowchart depicting the steps of a method for preparing a cleaning solution, according to an embodiment of the present disclosure. As shown in FIG. 1, the method to prepare a substrate for a self-cleaning coating may use a combination of the wet chemical and dry-cleaning methods. As such, an aspect of the present disclosure pertains to a method of cleaning a substrate using a photocatalytic reaction of titanium dioxide (hereinafter "$TiO_2$") via a light treatment.

Accordingly, in this embodiment to prepare the substrate, a $TiO_2$ nanoparticle solution may be prepared. In some embodiments, the $TiO_2$ nanoparticle solution may be colloidal. In other embodiments, the nanoparticle solution may comprise at least one $TiO_2$ nanoparticle at the base of the solution. Additionally, in some embodiments, the $TiO_2$ nanoparticle solution may include but is not limited to deionized water, ethanol, acetate, or any solution known in the art in which a colloidal $TiO_2$ nanoparticle solution may be formed. In this embodiment, as shown in FIG. 1, the $TiO_2$ nanoparticle solution may comprise deionized water. The $TiO_2$ may then be introduced into the solution and subsequently mixed. In this manner, the solution may be mixed by any means known in the art in which a colloidal $TiO_2$ nanoparticle solution may be formed. In some embodiments, the $TiO_2$ nanoparticle solution may be treated via sonication for a predetermined amount of time. In some embodiments, the predetermined amount of time may comprise a range of thirty (30) seconds to three (3) hours, encompassing every integer in between. For example, in some embodiments, the predetermined amount of time may be five (5) minutes, ten (10) minutes, twenty (20) minutes, and/or any time known in the art required to breakdown clustered $TiO_2$ nanoparticles. In this manner, the $TiO_2$ nanoparticles may be homogenously suspended in the solution. In some embodiments, the $TiO_2$ nanoparticle solution may be heterogeneously suspended in the solution.

Figure 2:
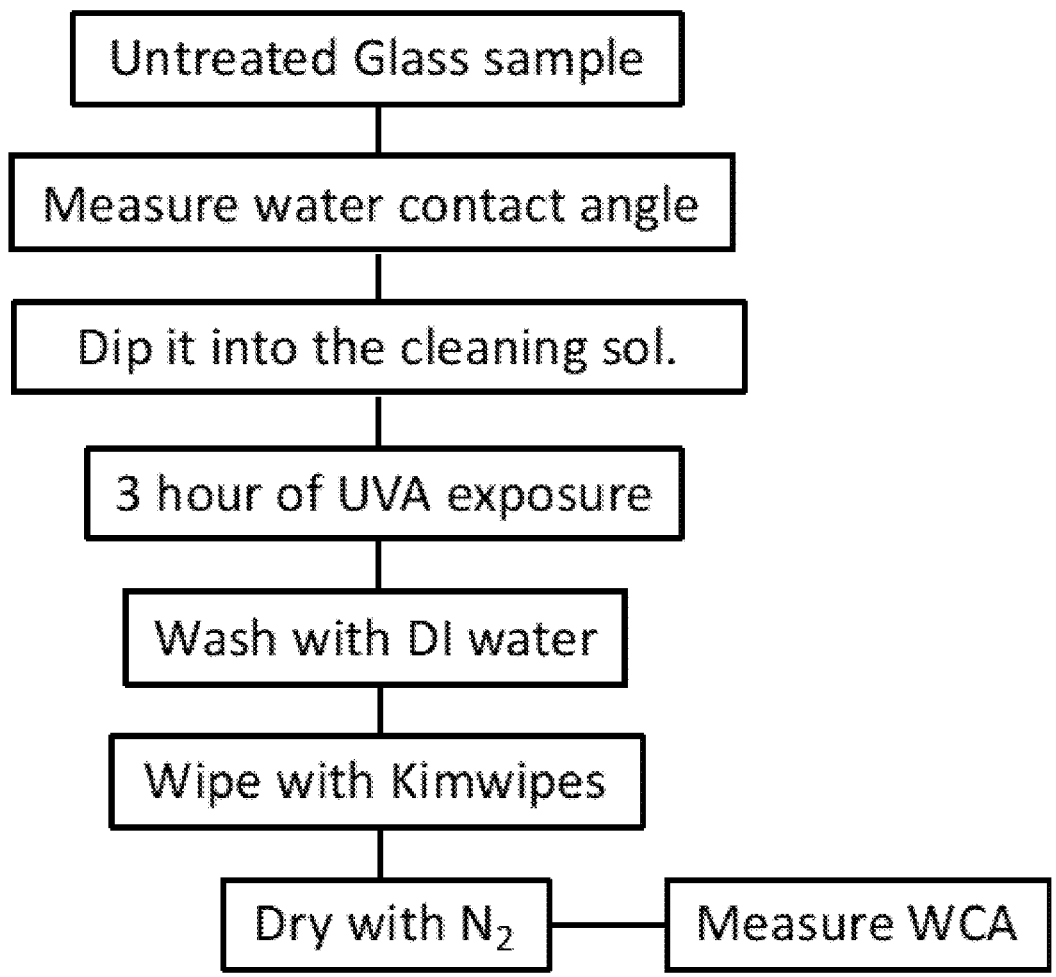
FIG. 2 is an exemplary flowchart depicting the steps of a method for cleaning a substrate, according to an embodiment of the present disclosure.

FIG. 2 depicts an exemplary flowchart depicting the steps of a method for cleaning a substrate, according to an embodiment of the present disclosure. In an embodiment, as shown in FIG. 2, water contact angle (hereinafter "WCA") measurement may be used to quantify the cleanliness of the substrate, to assess the cleanliness of the surface. In some embodiments, the effectiveness of the cleaning method may be determined by the surface wettability. As such, the more hydrophilic the surface of the substrate, the more effective the cleaning method. Additionally, as shown in FIG. 2, the WCA may be measured using an instrument including but not limited to a custom-built WCA apparatus with the use of ImageJ analyzing software and/or any apparatus known in the art which may measure the WCA. In some embodiments, water may be used to determine the WCA of the uncleaned substrate and/or the cleaned substrate. As such in some embodiments, the water many be deionized water. Accordingly, in these other embodiments the WCA of the substrate may be measured using ethanol, acetate, isopropyl alcohol, and/or any solution known in the art which may be used to measure the WCA of the substrate.

In an embodiment, the image of the water droplet may be taken. As such, the image of the water droplet may then be analyzed, and the WCA may be measured, accordingly. This process may be done before and/or after the substrate is cleaned via the photocatalytic reaction of $TiO_2$ via light exposure, such that the difference to evaluate the difference in the WCA may be measured.

Furthermore, as shown in FIG. 2, in an embodiment, the substrate may be emersed into the colloidal $TiO_2$ nanoparticle solution and exposed to a light treatment. As such, in some embodiments, at least one surface of the substrate may be configured to be hydrophilic due to the at least one $TiO_2$ nanoparticle disposed upon the at least one surface of the substrate. In this manner, the substrate may comprise superhydrophilic properties and/or characteristics, such that dirt, dust, debris, biological organism, water, and/or any other material known in the art which may impair the transmittance and/or function of the substrate, may be broken down via photocatalysis.

When the light treatment is over, in some embodiments, the substrate may be then rinsed with water. Additionally, in some embodiments, after the substrate has been rinsed, the substrate may also then be wiped with low-lint-low extractable wipe—such as a Kimwipe®—in order to remove at least one $TiO_2$ nanoparticle. As shown in FIG. 2, in these other embodiments, the substrate may then also be dried via pressurized gas, including but not limited to nitrogen, helium, oxygen, sulfur, and/or any gas known in the art which may dry a substrate. In addition, in some embodiments, the substrate may retain super-hydrophilic properties and/or characteristics even though the at least one $TiO_2$ nanoparticle may be removed from the substrate.

Furthermore, in an embodiment, as shown in FIG. 2, the WCA may then be measured to determine the effectiveness of the used cleaning method. Accordingly, in this embodiment, after the substrate is treated with the $TiO_2$-UVA cleaning, the WCA may comprise a range of at least 0.1° to at most 45°, encompassing every integer in between. For example, in some embodiments, the WCA of the of the substrate after the $TiO_2$-UVA cleaning may be at most 1.0°, 2.0°. 3.0°. 4.0°, 5.0°, 6.0°, 7.0°, 8.0°, 9.0°, 10.0°, 11.0°. 12.0°. 13.0°, and/or 14.0°. Additionally, in some embodiments the WCA may be at most 9.9°.

In this embodiment, the $TiO_2$-UVA cleaning may not use any harmful chemicals, and accordingly may be environmentally friendly. As such, leaving the substrate in the environment and exposing it to an environment will not cause any dissipation of any chemicals, toxins, and/or anything known in the art which may cause environmental damage. In some embodiments, the $TiO_2$-UVA treatment reduction reaction may utilize the oxygen in the air surrounding the substrate. Finally, in this embodiment, the decrease in WCA from the uncleaned glass and the $TiO_2$-UVA cleaning may occur in at least 20 minutes. In this manner, the WCA may decrease as the time from treatment increases. For example, the WCA of the substrate after treatment may be decreased from 39.2° to 15.2° in the first 20 minutes and may reach 11.4° in 60 minutes of the $TiO_2$-UVA cleaning, and further, may reach less than 10° after three hours. As such, after three hours, the WCA may show less than 2° difference than the one-hour treatment. In this embodiment, the optimum time required to sufficiently decontaminate and prepare the substrate for coating may be at most sixty minutes. In some embodiments, the optimum time required to sufficiently decontaminate and prepare the substrate may be at least sixty minutes.

Figure 3:
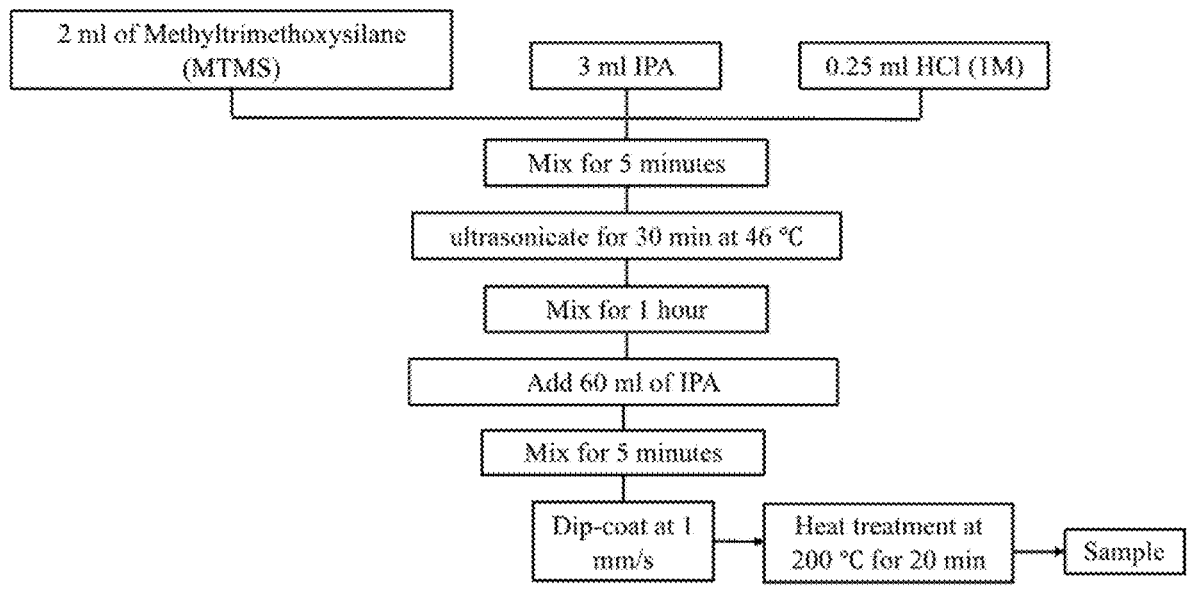
FIG. 3 is an exemplary flowchart depicting the steps of a method for fabricating a self-cleaning coating, according to an embodiment of the present disclosure.

Self-Cleaning Coating Fabrication:

FIG. 3 depicts an exemplary flowchart depicting the steps of a method for fabricating a self-cleaning coating, according to an embodiment of the present disclosure. In an embodiment, as shown in FIG. 3, the self-cleaning coating method may be based on fabricating a self-cleaning coating which comprises a coating prepared by the sol-gel process and applied to the substrate via an overlay method. As such, in some embodiments, the self-cleaning coating may comprise a silica film. The self-cleaning coating may be configured to remove debris, dust, water, biological organisms, and/or any material known in the art which may impair the transmittance and/or function of the substrate. In this embodiment, the coating solution may comprise a non-neutral pH medium, for example, an alcohol (e.g., Isopropyl Alcohol), while containing a silica precursor and a catalyst. As such, the catalyst may comprise an acidic molecule, a basic molecule, and/or any molecule known in the art which may initiate and/or enhance a reaction between a silica precursor and at least one water molecule within the non-neutral pH medium.

Moreover, in an embodiment, a polymerization reaction of the self-cleaning coating may take place via at least one reaction. In this embodiment, the polymerization may take place via at least three reactions. Accordingly, the polymerization reaction of the self-cleaning coating may begin with the hydrolysis of the silica precursor (e.g., Methyltrimethoxysilane (hereinafter "MTMS")) as shown in the Equation (1), provided below. Next, in this embodiment, the reaction may be followed by water condensation and/or alcohol condensation reactions, as shown in Equation (2) and (3), also provided below. As such a methanol may be removed from the silica precursor, such that at least one non-methylated silica precursor may be formed. Accordingly, after completing the reactions, a sol-gel solution (e.g., a silsesquioxane solution) may be formed from the at least one non-methylated silica precursor. In this manner, the sol-gel may be created through the condensing the silanol groups to form siloxane bonds.

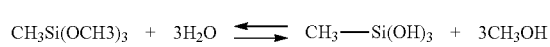
(1)

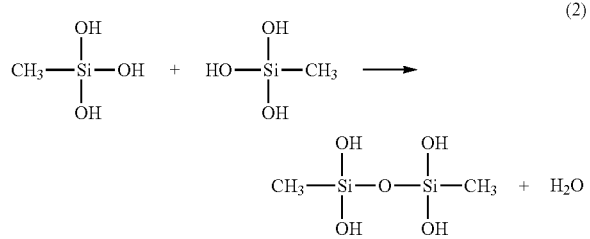
(2)

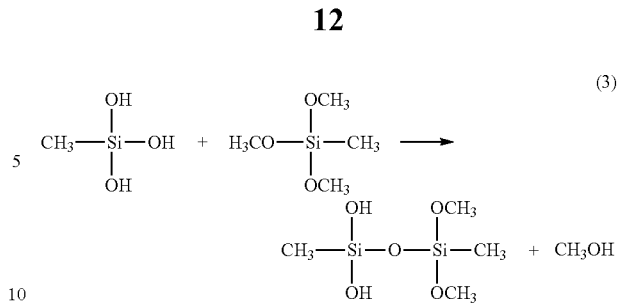
(3)

As shown in FIG. 3, in an embodiment, The coating mixture may be prepared by adding the silica precursor into a non-neutral pH medium, creating the sol-gel solution. As such, in this embodiment, the non-neutral pH medium may include but is not limited to an alcohol based solvent (e.g., isopropanol alcohol), and/or any solvent known in the art which may reduce surface tension between particles, such that a uniform composition may be created (e.g., homogenous solution). Accordingly, the non-neutral pH medium may comprise an acidic pH and/or a basic pH. In some embodiments, the total amount of the non-neutral pH medium may vary as the reaction occurs. In this manner, the total amount of non-neutral pH medium may be kept low initially, in order to increase the reaction speed. As shown in FIG. 3, the silica precursor may be mixed at a predetermined speed. In some embodiments, the silica precursor may be introduced to the non-neutral pH medium as a solid, such that when the silica precursor is added to a non-neutral pH medium, ultrasonics may be used to create uniform composition within the non-neutral pH medium (e.g., the homogeneous solution).

Moreover, as shown in FIG. 3, in some embodiments, a catalyst may be added to the sol-gel solution. As such, the catalyst may be added via dropwise into the sol-gel solution and/or via any method known in the art which a catalyst may be added to initiate a reaction between silica precursor and at least one water molecule. The addition of the catalyst may also reduce the pH of the sol-gel solution and initiate the reaction. Accordingly, in these other embodiments, when the catalyst is added to the non-neutral pH medium, the solution may then be covered. Furthermore, in some embodiments, as the sol-gel solution is covered, the sol-gel solution may also be mixed at a predetermined speed.

Moreover, in an embodiment, the sol-gel solution may be heated, such that the reaction rate between the silica precursor and the at least one water molecule within the non-neutral pH medium is increased. Additionally, in this embodiment, the rate of reaction between the silica precursor and the at least one water molecule may be further increased via the sonication and/or at least one additional water molecule may be added to the sol-gel solution. As such, the at least one additional water molecule may comprise deionized water. In addition, in some embodiments, the at least one water molecule may also be heated prior to being placed into the sol-gel solution. Furthermore, in these other embodiments, after the sonication is completed, the sol-gel solution may then be mixed at the predetermined speed in order to allow the sol-gel solution to cool. Accordingly, at least one additional reactions between the sol-gel and the at least one water molecule may take place during the cooling of the sol-gel solution. In this manner, as the sol-gel solution is cooled, the reaction rate between the sol-gel and the at least one water molecule may decrease.

Once the reaction is complete, in an embodiment, the sol-gel solution may transition from transparent to opaque.

Moreover, in this embodiment, additional non-neutral pH medium may be incorporated during the mixing process in order to reduce the acidity of the sol-gel solution. By adding additional non-neutral pH medium into the sol-gel solution, the concentration and viscosity of the coating solution may be adjusted, accordingly. For example, the sol-gel solution may have a pH of 1 and after the non-neutral pH medium has been added during the mixing process, the sol-gel solution may comprise a neutral pH. In some embodiments, the sol-gel solution may also comprise a viscosity having a range of at least 0.5 centipoise ("cP") to at most 5,000 cP, encompassing every integer in between.

In an embodiment, as shown in FIG. 3, the self-cleaning coating may be disposed upon the substrate via the overlay method. In this manner, the overlay method may be used to control the film thickness. Moreover, in this embodiment, a dip-coater may be used to coat the substrate in the self-cleaning coating. As such, the dip-coater may include but is not limited to a custom-built apparatus and/or any dip-coater known in the art which may perform the coating with a coating rate. In some embodiments, the coating rate may have a range of at least 0.1 mm/s to at most 5.5 mm/s, encompassing every integer in between. For example, in some embodiments the range may comprise 0.1 mm/s, 0.5 mm/s, 1 mm/s, 1.5 mm/s, 2.0 mm/s, 2.5 mm/s, 3.0 mm/s, 3.5 mm/s, 4.0 mm/s, 4.5 mm/, 5.0 mm/s, and/or 5.5 mm/s. Moreover, in order to ensure the self-cleaning coating is disposed uniformly upon the substrate, the coating speed may be variable based on the substrate being coated. In addition, in some embodiments, after the self-cleaning coating has been disposed upon the substrate, the self-cleaning coating may then be heated, such that the curing time of the self-cleaning coating is reduced, as shown in FIG. 3.

As shown in FIG. 3, in an embodiment, the concentration of the self-cleaning coating and/or the thickness of the uniform film of the self-cleaning coating may be variable based on the following, which includes but is not limited to, the substrate used, the transmittance of the substrate before coating, the transparency and/or opacity of the substrate before coating, the WCA before coating, the transmittance of the substrate after coating, the transparency and/or the opacity of the substrate after coating, and/or the WCA after coating. As shown in FIG. 3, in an embodiment, self-cleaning coating may comprise a ratio of a total amount of silica precursor amount to a total amount of non-neutral pH medium (hereinafter "SP:M ratio") having a range of at least 1:800 to at most 1:6 encompassing every integer in between, to reach the optimum results. In some embodiments, the optimum SP:M ratio of the self-cleaning coating may be at least 1:30. In addition, while the total amount of silica precursor used within the self-cleaning coating may be fixed, the total amount of non-neutral pH medium may be varied based on the following, which includes but is not limited to, the substrate used, the transmittance of the substrate before coating, the transparency and/or opacity of the substrate before coating, the WCA before coating, the transmittance of the substrate after coating, the transparency and/or the opacity of the substrate after coating, and/or the WCA after coating. In these other embodiments, the total amount of non-neutral pH medium may also be varied to alter the total silica precursor concentration within the self-cleaning coating. Additionally, the self-cleaning coating may be disposed upon the substrate with a fixed coating rate.

Figure 11:
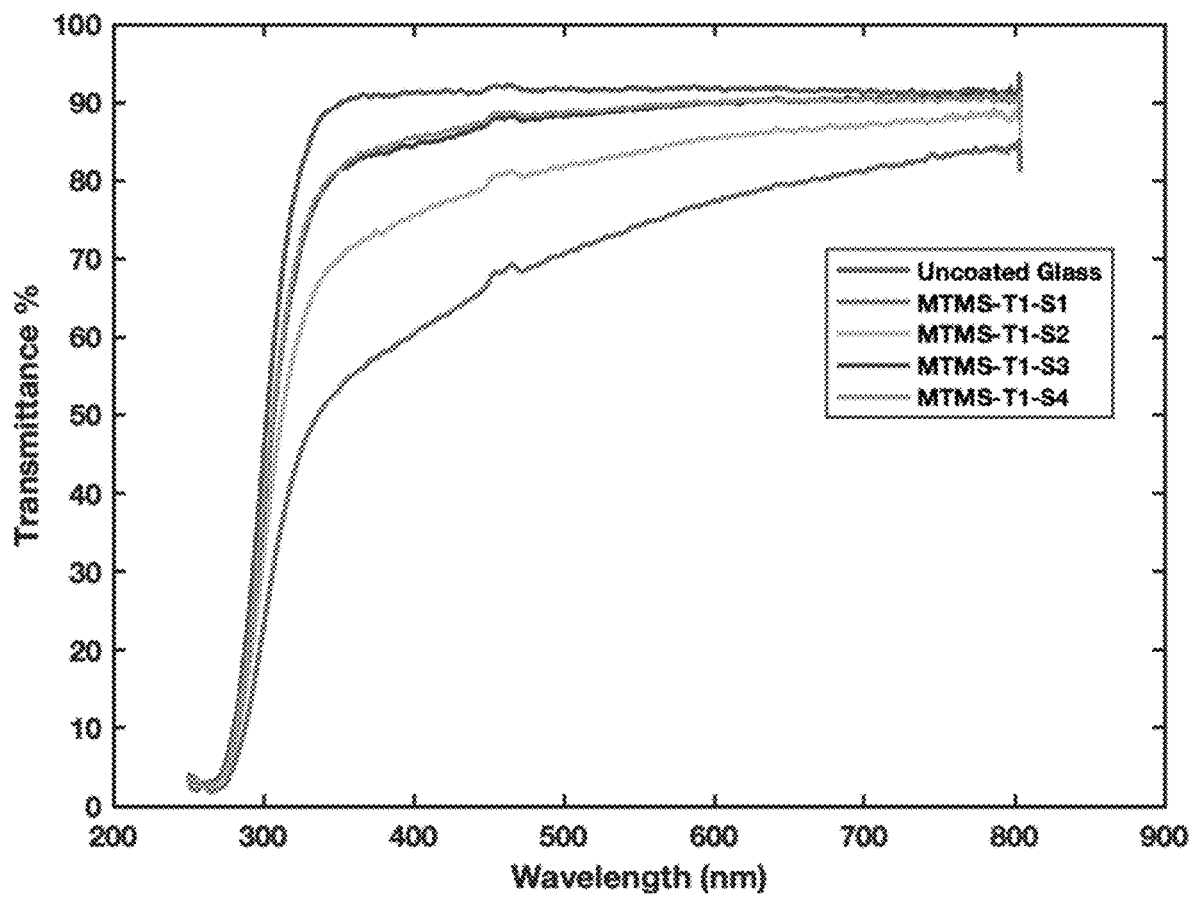
FIG. 11 is a plot illustrating an optical transmittance spectra of four coated substrates on a first trial of a self-cleaning coating with different coating solution concentration ratios, according to an embodiment of the present disclosure.
Figure 12:
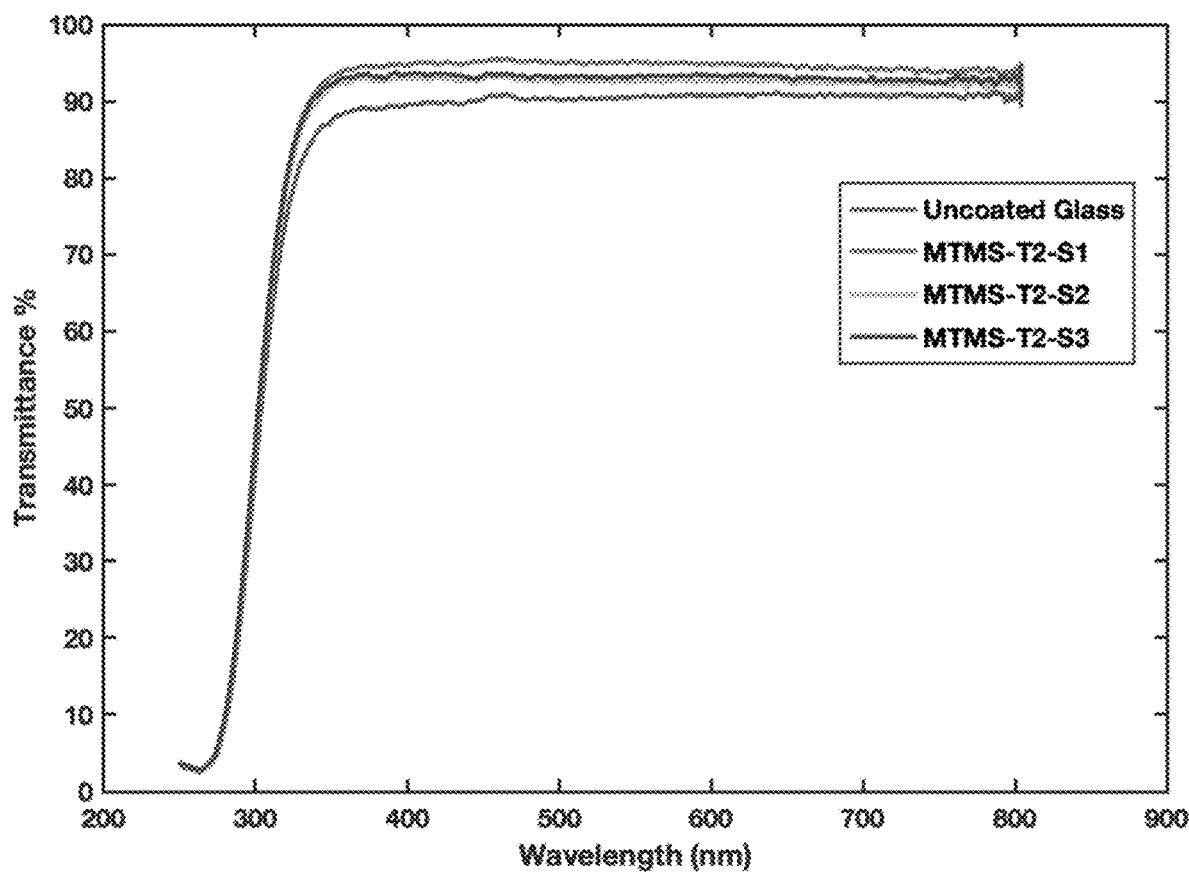
FIG. 12 is a plot illustrating an optical transmittance spectra of four coated substrates on a second trial of a self-cleaning coating with different coating solution concentration ratios, according to an embodiment of the present disclosure.

Moreover, as shown in FIGS. 11-14, another feature of the present disclosure is that the transmittance of a substrate including the self-cleaning coating (hereinafter "coated substrate") may be enhanced by altering the SP:M ratio of the self-cleaning coating. Accordingly, in an embodiment, the transmittance may be improved by reducing the SP:M ratio of the self-cleaning coating until an optimum transmittance level is reached for the coated substrate. Furthermore, in this embodiment, after the optimum transmittance level for the coated substrate is reached, as the SP:M ratio is further decreased, the transmittance level of the coated substrate then reduces to the original transmittance level of the uncoated substrate. (e.g., a SP:M ratio beginning at 1:6 and ending at 1:800). For example, as shown in FIG. 12, once the optimum transmittance level was reached, as the SP:M ratio of the self-cleaning coating was further reduced the transmittance level of the coated substrate returned to the original value of the substrate and remained constant, as the concentration was lessened using additional solvent. In this embodiment, the optimum transmittance level for the substrate may be reached when the SP:M ratio of the self-cleaning coating may be at least 1:60.

Figure 13:
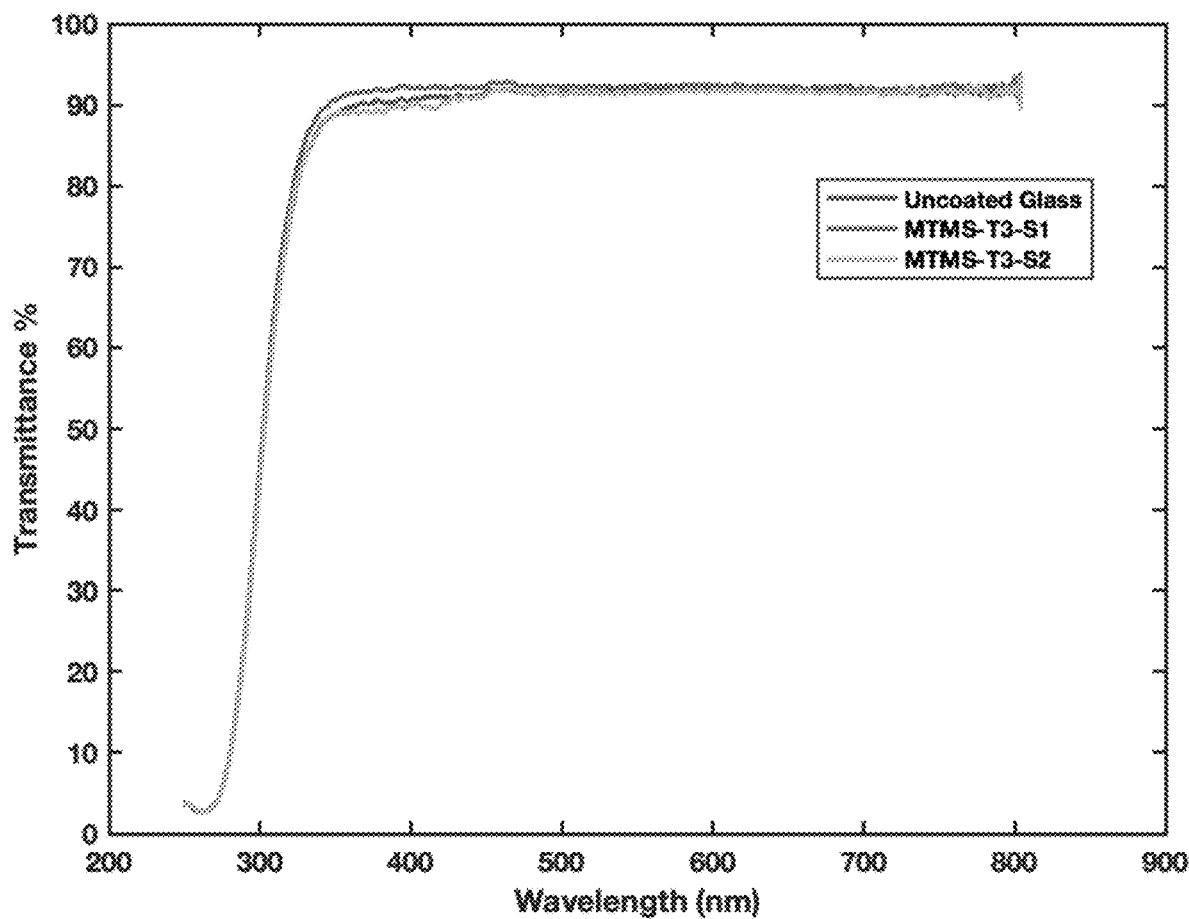
FIG. 13 is a plot illustrating an optical transmittance spectra of four coated substrates on a third trial of a self-cleaning coating with different coating solution concentration ratios, according to an embodiment of the present disclosure.
Figure 14:
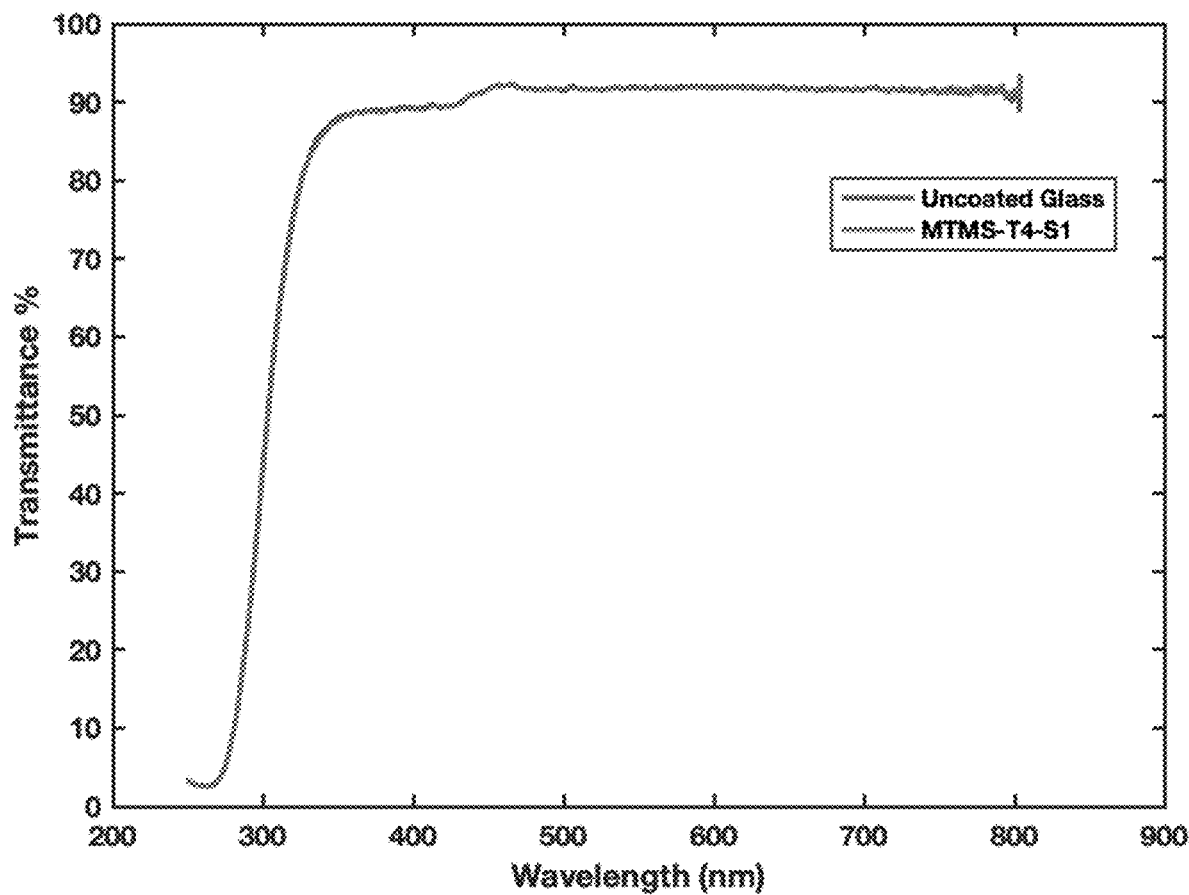
FIG. 14 is a plot illustrating an optical transmittance spectra of four coated substrates on a fourth trial of a self-cleaning coating with different coating solution concentration ratios, according to an embodiment of the present disclosure.

Furthermore, as shown in FIGS. 11-14, in an embodiment, the reduced SP:M ratio of the self-cleaning coating may comprise a transmittance having a range between at least 70-98%, encompassing every integer between. Additionally, in this embodiment, the improvement in transmittance may also be caused by an increase in surface roughness of the substrate and/or by reaching the optimum film thickness. As a result, the increase in surface roughness of the substrate may reduce the amount of light reflected from the uncoated glass and may increase the light transmitted. In this manner, in some embodiments, before the self-cleaning coating is applied, the substrate may be etched, engraved, and/or altered via any method known in the art such that the surface roughness of the substrate is increased. Accordingly, as the SP:M ratio of the self-cleaning coating is decreased, the thickness of the self-cleaning coating may also decrease. In some embodiments, as shown in FIG. 14, at low SP:M ratio of the self-cleaning coating—for example, an SP:M ratio of 1:800—the transmittance may be almost identical to the transmittance of the uncoated substrate, such that the self-cleaning coating may have no effect on the substrate. In this manner, in some embodiments when the SP:M ratio was low the self-cleaning coating may also be entirely invisible to the human eye.

Figure 15:
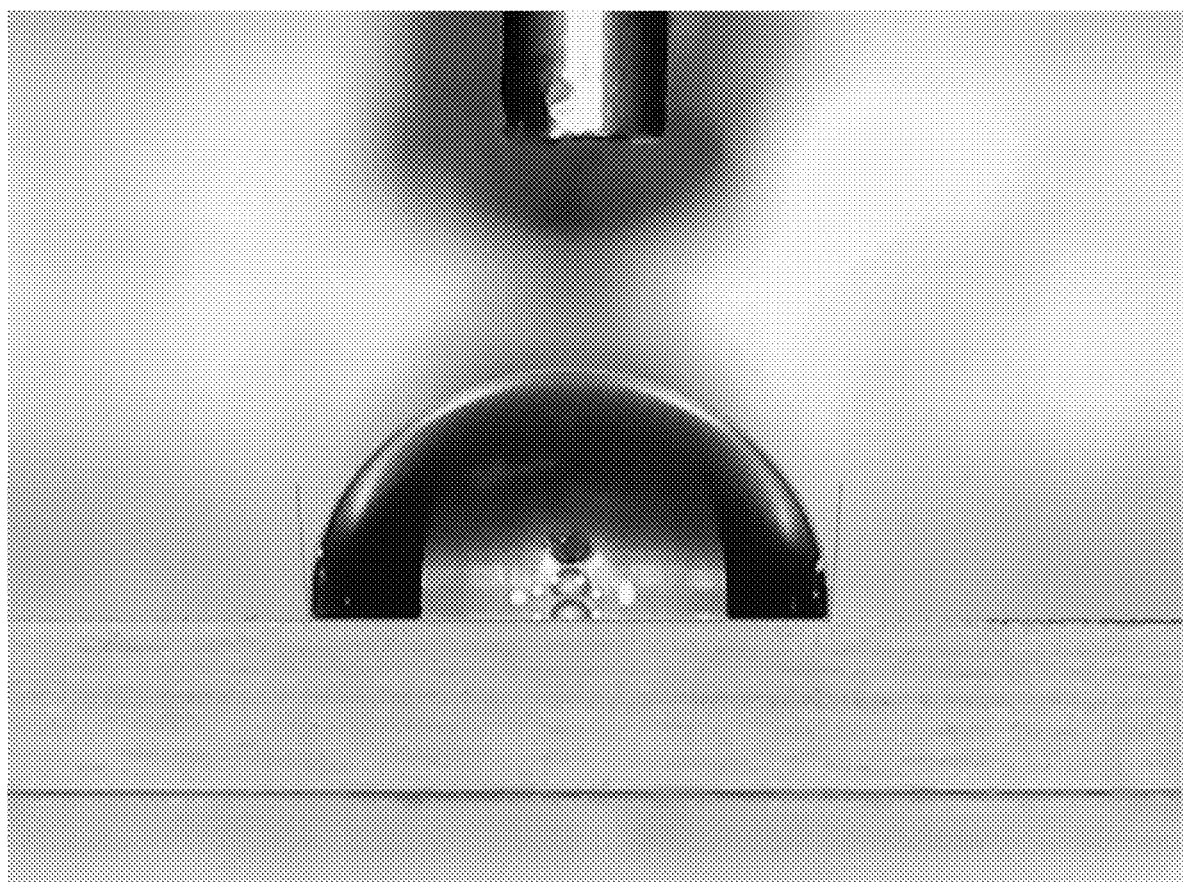
FIG. 15 depicts a water droplet shape on a surface of a self-cleaning coating, according to an embodiment of the present disclosure.

In addition, another aspect of the present disclosure is that the self-cleaning properties of the coated substrate may be enhanced via the self-cleaning coating. As shown in FIG. 15, in an embodiment, the WCA of the coated substrate may be measured to determine the surface wettability using a contact angle goniometer. As such, the more hydrophobic the surface, the better the self-cleaning property, so as the SP:M ratio of the self-cleaning coating decreased, the hydrophobicity of the coated substrate may increase. Accordingly, in an embodiment, the WCA of the self-cleaning coating may increase as the SP:M ratio is decreased, reaching an optimum WCA value. For example, in some embodiments, the WCA value of the self-cleaning coating having a SP:M ratio of at least 1:6 may be at least 87.0°, as compared to the WCA value of the self-cleaning coating having a SP:M ratio of at least 1:100, which may be at least 93.2°. Additionally, after the optimum WCA value was obtained, as the SP:M ratio of the self-cleaning coating was further reduced, the WCA value decreased at a constant rate with the SP:M ratio. For example, the WCA value of the self-cleaning coating having a SP:M ratio of at least 1:100 may be at least 93.2°, as compared to the WCA value of the self-cleaning coating having a SP:M ratio of at least 1:800, which may be at least 80.0°. In this embodiment, the optimum WCA value may be reached when the SP:M ratio of the self-cleaning coating may be at least 1:60. Moreover, in this embodiment, the coated substrate may comprise hydrophobic characteristics and/or properties, such that dust, debris, dirt, biological organisms, and/or water may be removed from at least one surface of the coated substrate. As such, in some embodiments, the coated substrate may be configured to comprise superhydrophobic characteristics and/or properties. Accordingly, due to the superhydrophobic characteristics as provided to the substrate via the self-cleaning coating, the coated substrate may comprise enhanced anti-fouling, anti-fogging, anti-icing properties. In this manner, the coated substrate may be configured to repel water such that the coated substrate may remain dry and avoid potential biofouling on at least one surface of the coated substrate.

In addition, in some embodiments, before the self-cleaning coating is applied, the substrate may be etched, engraved, and/or altered via any method known in the art such that the surface roughness of the substrate is increased. In this manner, the surface hydrophobicity of the self-cleaning coating may be optimized.

Figure 16:
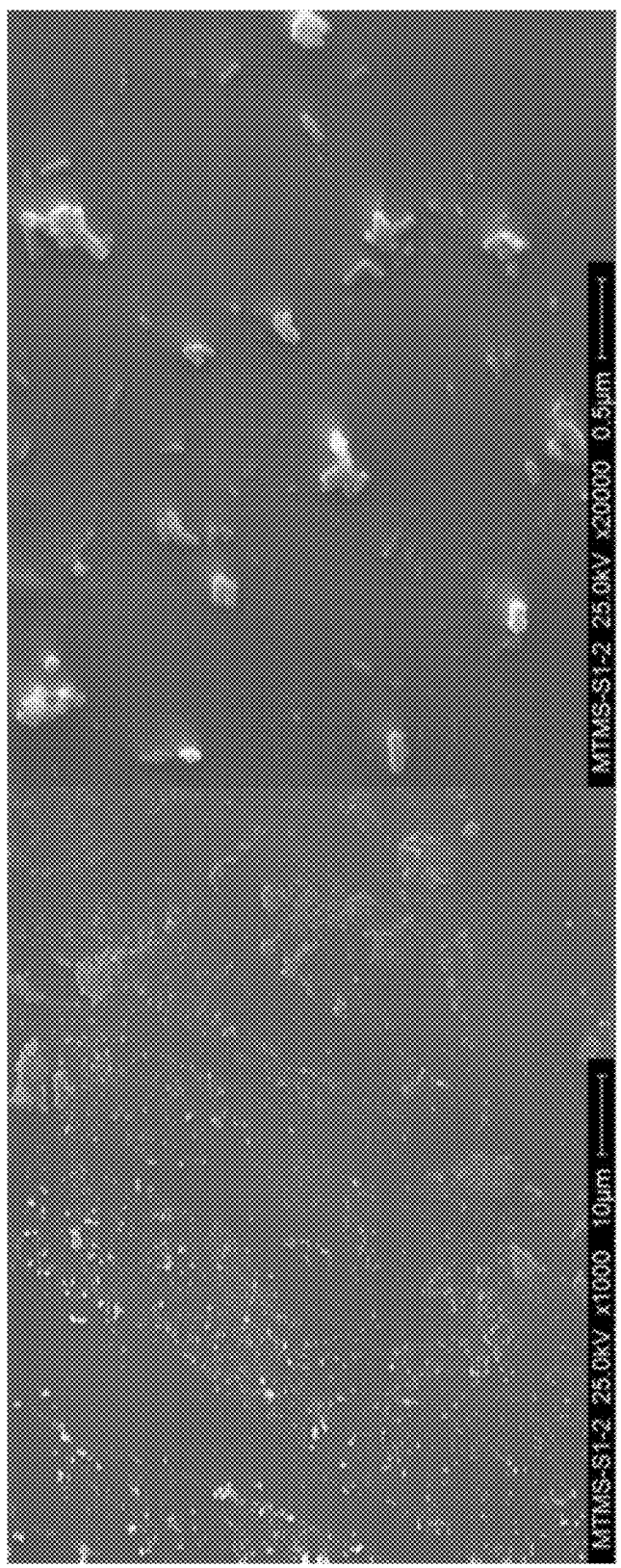
FIG. 16 is a SEM image of a self-cleaning coating at a ×1000 and ×20,000 magnification, according to an embodiment of the present disclosure.

As shown in FIG. 16, the SEM may be used to determine a surface morphology of the coated substrate. In this manner, the SEM may provide a better understanding of the shape, size, and/or distribution (e.g., uniformity) of the self-cleaning coating disposed upon the substrate. Additionally, FIG. 16 depicts the uniformity of the self-cleaning coating disposed on the substrate, according to an embodiment of the present disclosure. In some embodiments, the self-cleaning coating may be different in shape and at most 500 nm in size. As such, in these other embodiments, the self-cleaning coating may comprise a thicker film at least one end of the substrate than the film at an alternative end of the substrate.

Figure 17:
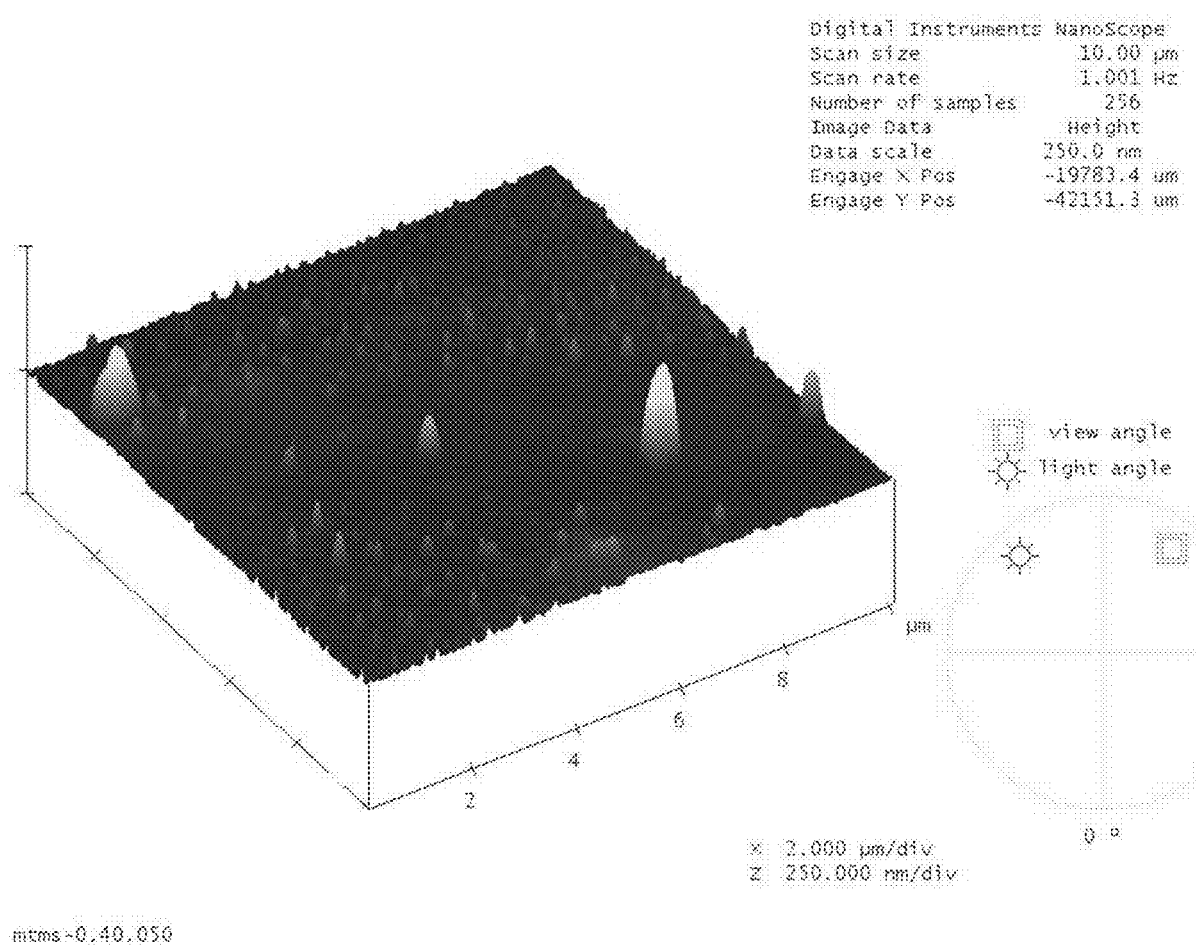
FIG. 17 is an Atomic Force Microscopy (hereinafter "AFM") image of a self-cleaning coating, according to an embodiment of the present disclosure.

Additionally, as shown in FIG. 17, an AFM may be taken in the tapping mode of the surface of the coated substrate. In this embodiment, the surface roughness of the coated substrate may have a range of at least 5 nm to at most 100 nm. In this manner, the higher the surface roughness of the coated substrate, the better the self-cleaning property.

Furthermore, in some embodiments, multiple silane materials may be added to the sol-gel solution. As such, the surface energy of the self-cleaning coating may be lowered. The silane materials may comprise any silane material known in the art with a low surface energy. Finally, in some embodiments, the overlay method may comprise a spray coating, a layering coating, and/or any method known in the art used for applying a coating to the substrate. For example, the spray coating may be more economical for large scale substrate manufacturing.

The following examples are provided for the purpose of exemplification and are not intended to be limiting.

EXAMPLES

Example 1

Substrate Preparation:

To clean the substrates, a colloidal $TiO_2$ nanoparticle solution was prepared in a 250 ml beaker filled with 200 ml of deionized water. Then 5 g of P25 $TiO_2$ nanoparticles were mixed into the solvent. As shown in FIG. 1, the solution was mixed using a magnetic stirrer for 5 minutes at medium speed. Then the beaker was covered with aluminum foil and placed in an ultrasonic cleaner filled with tap water at 50° C. The solution was ultrasonicated for 20 minutes to breakdown the clustered $TiO_2$ nanoparticles and keep them homogeneously suspended in the solution. After sonicating the solution, it was stirred for 5 minutes, and the solution was ready to be used.

To quantify the cleanliness of the substrate, water contact angle measurement was used as a relatively quick and easy method for assessing the cleanliness of the glass surface. The effectiveness of the cleaning method was determined by the surface wettability. The more hydrophilic the surface the more effective the cleaning method. Many reported wide variations in equilibrium contact angle using different cleaning methods.

As shown in FIG. 2, the contact angle was measured using a custom-built contact angle apparatus with the use of ImageJ analyzing software. Using a syringe with a needle tip, one milliliter of deionized water was drawn into the syringe and placed on the syringe holder. A new untreated substrate was placed on the substrate stage. The stage height and tilt were adjusted. The digital microscope focus was fine-tuned. Then a water droplet was released from the syringe, and an image of the water droplet was taken 10-20 seconds after. The image of the water droplet was analyzed, and the contact angle was measured. This process was done before and after cleaning the glass slides to evaluate the difference in water contact angle (WCA) and the effectiveness of the used cleaning method.

After the first measurement of the substrate water contact angle, the substrate was dipped into the colloidal $TiO_2$ nanoparticle solution and placed for 3 hours under UV-A light. When the UV treatment is over, the substrates were rinsed with DI water and wiped with Kimwipes to remove the remaining $TiO_2$ particles, and dried with pressurized nitrogen.

Figure 4:
FIG. 4 depicts a substrate divided into a treated and untreated section, according to an embodiment of the present disclosure.
Figure 5:
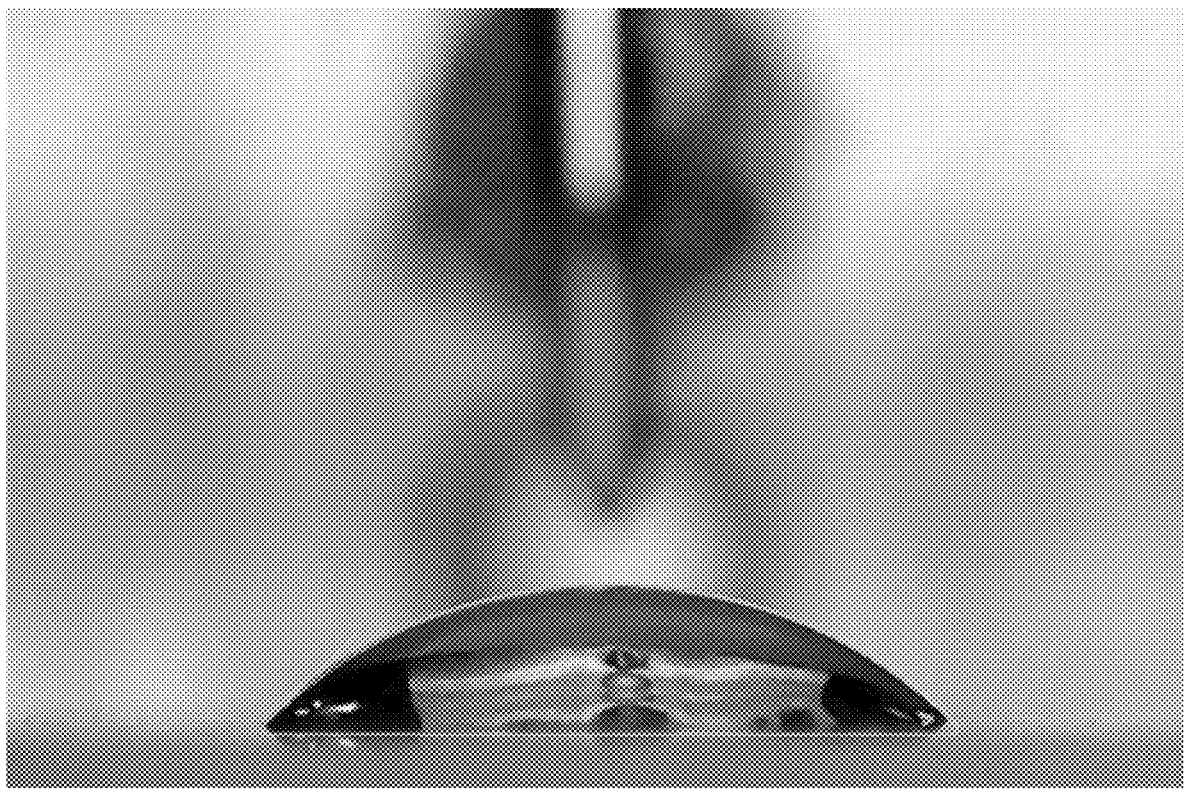
FIG. 5 depicts a water droplet shape on a substrate before treatment, according to an embodiment of the present disclosure.

As shown in FIG. 4, in the first part of the treatment process, two different cleaning solutions was prepared. The first solution was prepared with TiO2 and Isopropyl alcohol as a solvent. The second solution with TiO2 and water as solvent. UV light exposure of 3 hours was used to determine the effect of the solvent used on the photocatalytic reaction. Additionally, as shown in FIG. 4, a soda lime-substrate was divided into two halves by a tape to mark treated and untreated sides. The average contact angle before cleaning was measured on each side of both substrates to be 45.2°. FIG. 5 depicts the WCA of one of the substrates before treatment.

Figure 6:
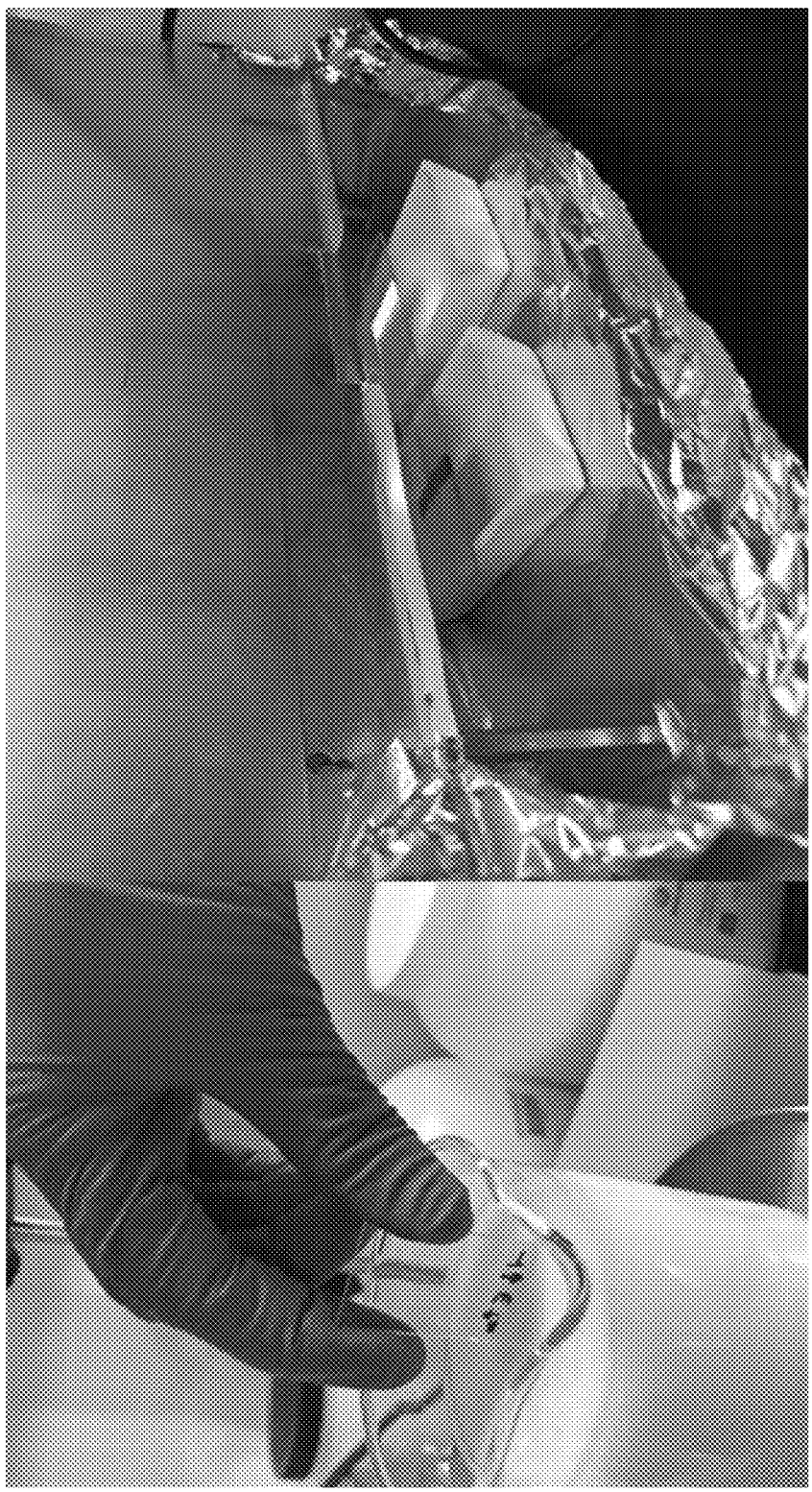
FIG. 6 depicts a substrate having a water-$TiO_2$ solution and treated under a UV-A light, according to an embodiment of the present disclosure.
Figure 8:
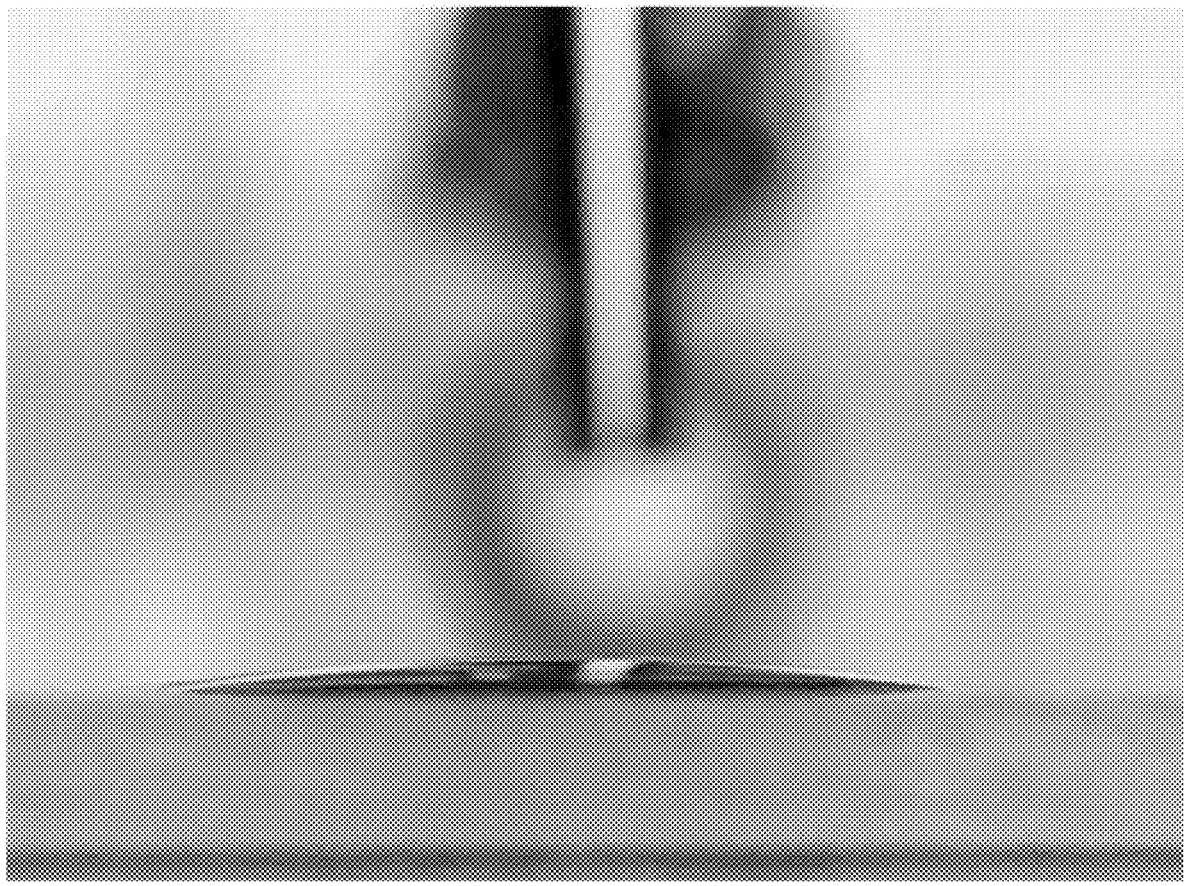
FIG. 8 depicts a water droplet shape on a substrate after treatment with $TiO_2$-UVA, according to an embodiment of the present disclosure.

As shown in FIG. 6, the substrate was then dipped three times into the IPA-TiO2 solution and the other one into the water-TiO2 mixture. Then they were placed under UV-A light for three hours. The water contact angle was then measured after the treatment on both sides of the two substrates. The untreated side of both substrates showed a slight to no change in the WCA. On the other hand, the treated side of both substrates showed a significant reduction in the WCA. As shown in FIG. 6 and FIG. 8, the WCA of the IPA-TiO2 substrate was reduced to 13.8°, and the water-TiO2 substrate was 9.9° after treatment.

The experiment was then repeated after 24 hours with new substrates and the same mixing solutions. The water contact angle of the water-TiO2 substrate was almost the same with only one degree higher, but the IPA-TiO2 substrate showed an increase in the WCA to 26.1°. That means that there was a reduction in the cleaning efficiency of the IPA-TiO2 solution after 24 hours. The reduction in performance could be due to the organic nature of the IPA that may deactivate some of the TiO2 active sites. Besides, both trials showed a better performance using the water-TiO2 mixture. In the second part of the substrate treatment process, Since water-based solvent showed enhanced performance in the first part, it was used in the second part of the substrate treatment process also. In this part, the time of treatment under UV-A light was varied to determine the optimum time for best cleaning results.

Figure 7:
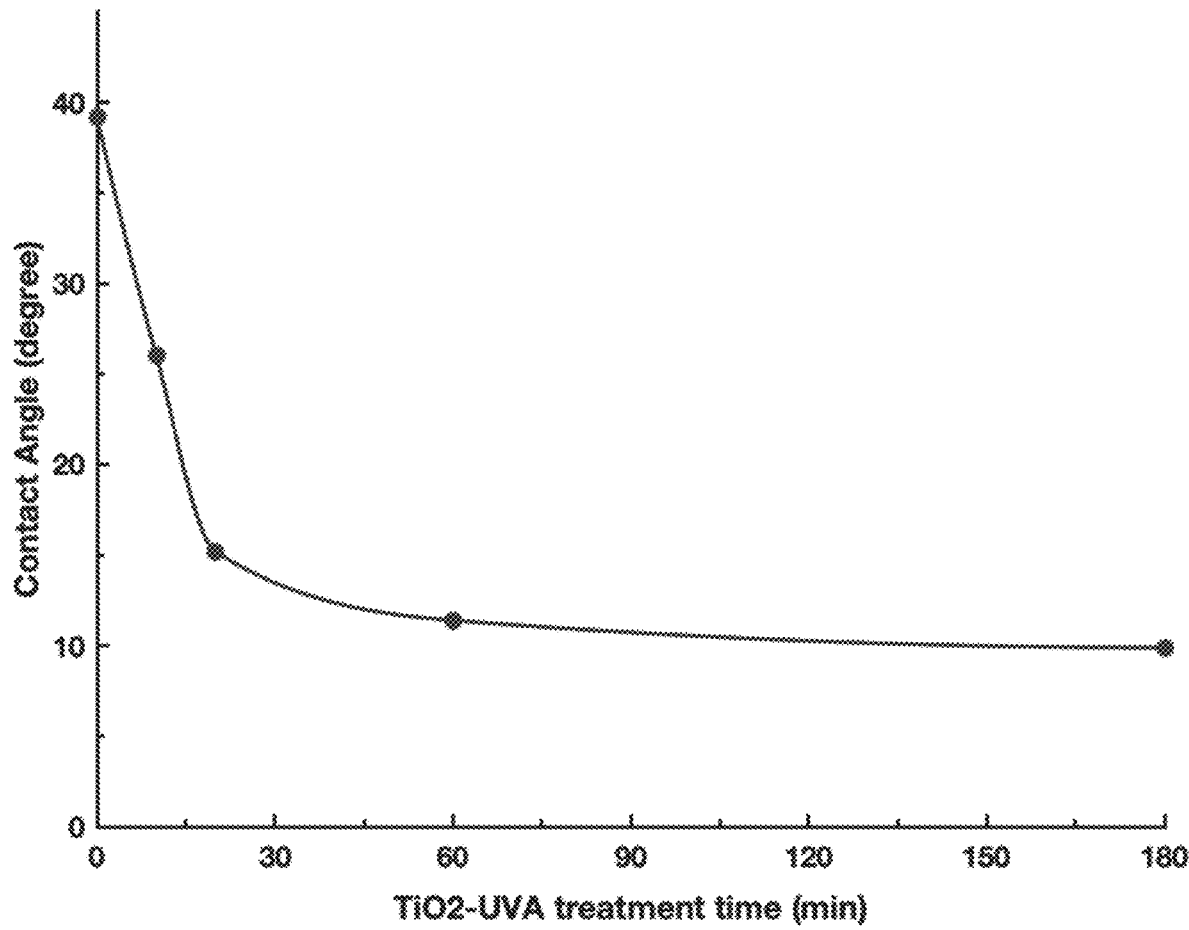
FIG. 7 is a plot illustrating an effect of a $TiO_2$ solution on a water contact angle, according to an embodiment of the present disclosure.

Five untreated substrates were cleaned at different time periods, and their WCA was measured before and after treatment. The average WCA of the substrates before cleaning was measured to be 39.2°. As shown in FIG. 7, the WCA measurements were taken at time 0, 10, 20, 60, and 180 minutes. The result showed a rapid decrease in the WCA in the first 20 minutes from 39.2° to 15.2°, and then it slowed down to reach 11.4° for 60 minutes of treatment. After three hours, the WCA showed less than 2° difference than the one-hour treatment. That means 60 minutes of leaning time is sufficient to decontaminate and prepare the surface for coating. FIG. 8 depicts the shape of the water droplet after three hours of treatment.

In comparison, the substrate cleaning processes, using TiO2-UVA, showed a better cleaning performance than all the wet chemical methods after 60 minutes of treatment with a WCA of 11.4° and less than 10° after 3 hours. In addition to being better in the cleaning performance of substrates, this method uses no harmful chemicals, and is environmentally friendly, simple, and cheap.

Figure 9:
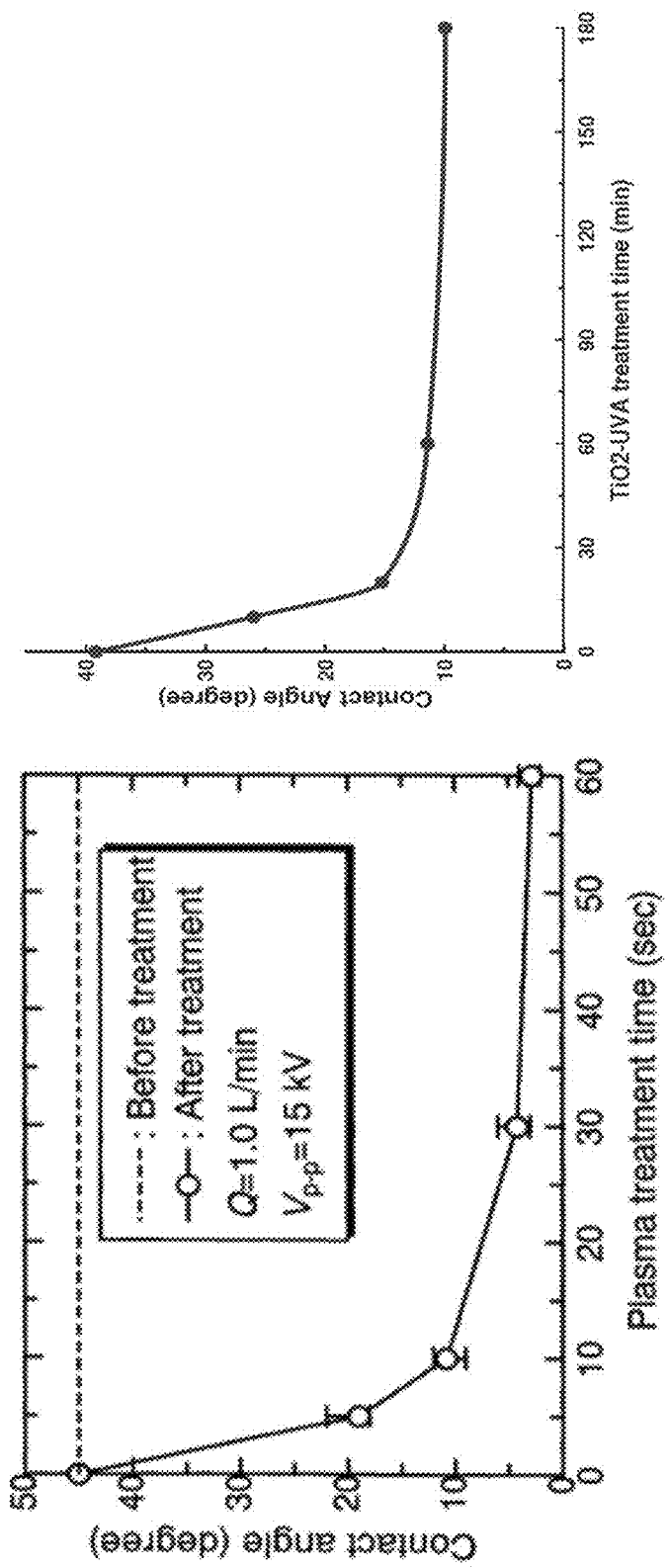
FIG. 9 is a plot illustrating a comparison between the effect of a plasma treatment and a $TiO_2$-UVA treatment on a contact angle, according to an embodiment of the present disclosure.

The contact angle of their substrates was 45° before treatment. In 60 seconds of plasma treatment, they were able to reach less than 4° contact angle. As shown in FIG. 9, the contact angle did not change after 60 seconds of treatment.

In terms of scientific concept, a plasma treatment chemical reaction is relatively similar to the reduction reaction of the TiO2-UVA treatment, where both use oxygen to produce oxygen radicals and react with organic contaminants. However, the difference in efficiency could be due to the rate of oxygen radicals forming. In the plasma treatment process, compressed air is used to actively pass oxygen through high voltage to produce oxygen radicals and hit the surface of the substrate to react and decontaminate it. In comparison, the TiO2-UVA treatment reduction reaction utilizes oxygen in the air surrounding the substrate, which makes the reaction rate significantly slower.

Figure 10:
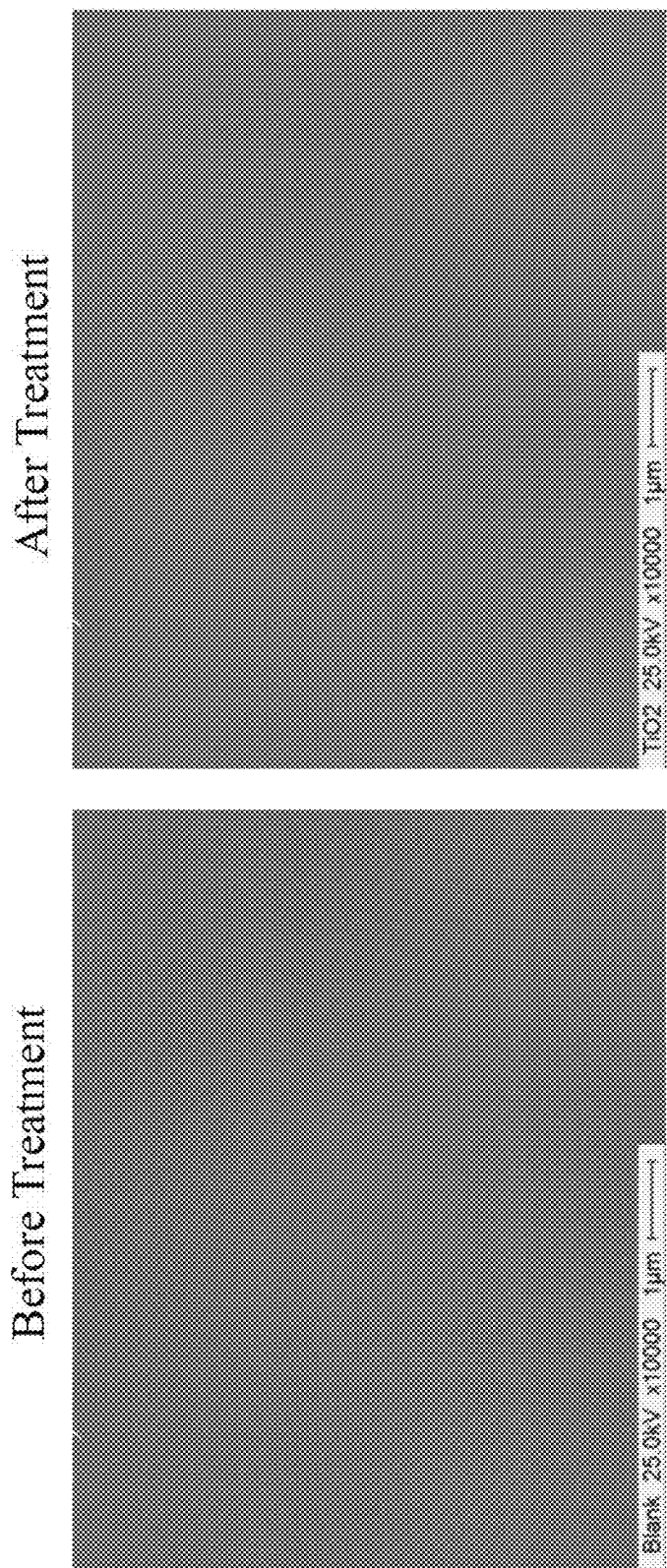
FIG. 10 is a Scanning Electron Microscope (hereinafter "SEM") image of a substrate before and after a $TiO_2$-UVA treatment, according to an embodiment of the present disclosure.

As shown in FIG. 10, SEM images were taken before and after treatment to ensure that no TiO2 nanoparticles were left on the glass surface after treatment. The SEM images showed that there was no difference between the images taken before and after treatment and no TiO2 nanoparticles left on the substrate surface.

The substrate cleaning method, described in the Example herein, was based on using the photocatalytic reaction of $TiO_2$ when exposed to UV-A light to breakdown organic contaminants on the glass surface. The surface wettability was used to test the effectiveness of the cleaning method. The water contact angle was measured before and after treatment. The result showed a super-hydrophilic surface with WCA of 9.9° after three hours of treatment. However, one hour of treatment is used for later experiments as an optimum time to reach a WCA of 11.4°.

Example 2

Fabricating a Self-Cleaning Substrate Hydrophobic Coating from a Methyltrimethoxysilane (hereinafter "MTMS") Precursor The coating method is based on fabricating a hydrophobic silica film using a coating prepared by the sol-gel process and dip-coating method. The coating solution is alcohol-based using Isopropyl Alcohol as solvent (IPA, Fisher Scientific) containing silica precursor (MTMS, 98%, Sigma-Aldrich, 246174) and hydrochloric acid (HCl, 36.5-38%, VWR Chemicals) as a catalyst.

In this method, a polymerization reaction of silane takes place in three main reactions. It starts with the hydrolysis of the MTMS shown in Equation (1), provided above, followed by water condensation and Alcohol condensation reactions, as shown in Equation (2) and (3), also provided above, such that a sol-gel solution, or silsesquioxane is formed by condensing the silanol groups to form siloxane bonds.

As shown in FIG. 3, the coating mixture was prepared by adding 2 ml of MTMS into 3 ml of IPA solvent in a 250 ml beaker. The amount of solvent was kept low at the beginning to make the reaction happen faster with the minimum amount of acid and at a low concentration. The mixture was placed in a magnetic stirrer and stirred at a medium speed. Then, 1 molar of hydrochloric acid was prepared, and 0.25 ml was added dropwise to the coating mixture. The addition of HCl reduced the pH to 1 and initiated the reaction. The solution was then covered with aluminum foil and left to stir for 5 minutes. To speed up the reaction rate, the coating solution was sonicated in an ultrasonic homogenizer filled with tap water at 46° C. for 30 minutes. After the sonication was over, the solution was moved back to the magnetic stirrer and stirred for one hour at medium speed to allow the mixture to cool down and the reaction to go to completion. When the reaction is completed, the color of the solution should turn to opaque. More solvent was then added while it is stirring to reduce the acidity and adjust the concentration and the viscosity of the coating. To get to the optimum concentration 60 ml of isopropyl alcohol was added Additionally, as shown in FIG. 3, the coating deposition was implemented using the dip-coating method to control the film thickness. The used dip-coater was custom-built to perform the coating with an adjustable constant dipping rate ranging between 0.1-2.5 mm/s. The dipping speed was set to be 1.0 mm/s to ensure uniform thin-film deposition. The substrate was then heat-treated at 200° C. for 20 minutes in an oven to speed up the coating curing time.

The self-coating concentration was adjusted based on the results of the substrate transparency and the water contact angle after coating. Four trials were conducted with different amounts of precursor varying from 3-0.5 ml to reach the optimum results. The amount of precursor in each trial was fixed, and the amount of solvent was varied from 60 to 240 ml to adjust the concentration. The coating deposition was performed using the dip-coating technique with a fixed deposition rate. The number of substrates tested was depending on the transmittance results. The test was stopped when no change was observed in transmittance. Tests were conducted to measure transparency, contact angle, microstructure and morphology, and surface topography and roughness. The equipment used for these tests included UV visible spectrophotometry, contact angle goniometry, SEM, and AFM, respectively. The results of these tests are discussed in this section.

Transmittance of the coated substrates was measured in four trials. The four trials were conducted to find the coating solution concentration needed to reach the optimum coating transmittance. The amount of MTMS added was 3, 2, 1, and 0.5 ml for trials 1, 2, 3, and 4, respectively.

As shown in FIG. 11, in the first trial, 3 ml of MTMS was added to the reaction mixture, and the amount of solvent was varied. Four substrates were prepared and tested at 60, 120, 180, 240 ml of solvent, referred to as MTMS_T1_S1, MTMS_T1_S2, MTMS_T1_S3, and MTMS_T1_S4, respectively. The results of the first trial showed that the first substrate (MTMS_T1_S1), with the highest coating solution concentration, had the lowest transmittance ranging between 50-85% in the UV-Visible range. The transmittance improved by reducing the solution concentration. The improvement in transmittance reached its maximum and remained constant after the third ample (MTMS_T1_S3), with transmittance ranging between 80-90%. All four substrates were below the transmittance of the uncoated substrate. As a result, the amount of MTMS was reduced in the second trial.

As shown in FIG. 12, in the second trial, 2 ml of MTMS added to the reaction mixture, and the amount of solvent was varied. Three substrates were prepared and tested at 60, 90, 120 ml of solvent, referred to as MTMS_T2_S1. MTMS_T2_S2, and MTMS_T2_S3, respectively. The results of the second trial showed that the first substrate (MTMS_T2_S1), with the highest coating solution concentration, had the maximum transmittance of 95% in the UV-Visible range. The transmittance continued to slightly fall by reducing the solution concentration. All three substrates were above the transmittance of the uncoated substrate with a maximum transmittance difference of 5%. The improvement in transmittance could be due to the increase in surface roughness and reaching the optimum film thickness. As a result, it reduces the amount of light reflected from the uncoated glass and increases the light transmitted.

As shown in FIG. 13, a third trial was conducted at lower MTMS concentrations to confirm that this is the optimum result. In the third trial, 1 ml of MTMS added to the reaction mixture, and the amount of solvent was varied. Two substrates were prepared and tested at 60 and 120 ml of solvent, referred to as MTMS_T3_S1, and MTMS_T3_S2, respectively. The results of the third trial showed a slight difference in transmittance between the first (MTMS_T3_S1), second (MTMS_T3_S2), and the uncoated substrates in the UV range. However, they almost aligned in the visible range. It means that the film of the coated substrates is extremely 51 thin that the transmittance is almost the same as the uncoated glass. A fourth trial was conducted to confirm it and to determine the water contact angle change at a very low concentration.

As shown in FIG. 14, in the fourth trial, 0.5 ml of MTMS added to the reaction mixture, and the amount of solvent was varied. One substrate was prepared and tested at 60 ml of solvent, referred to as MTMS_T4_S1. The result of the fourth trial showed that the transmittance of the coated (MTMS_T4_S1) and the uncoated substrates was exactly aligned. That indicates that the coating becomes completely invisible. A simple way to confirm that the coating was deposited onto the substrate was by measuring the WCA.

The contact angle was measured to determine the surface wettability using the contact angle goniometer. In this method, the more hydrophobic the surface, the better the self-cleaning property. The measurements were summarized in TABLE 1, provided below, for all the coated substrates. The objective was to measure the WCA and determine the effect of changing the coating solution concentration to determine the optimum coating result.

TABLE 1

| Sample | S1 | | S2/S3 | | S/4 |
|---|---|---|---|---|---|
| Amount of IPA (ml) | 60 ml | 90 ml | 120 ml | 180 ml | 240 ml |
| Trial | | Water Contact Angle (Degrees) | | | |
| Trial 1 (3 ml MTMS) | 90.8 | — | 90.4 | 90.1 | 87.4 |
| Trial 2 (2 ml MTMS) | 92.2 | 92.2 | 95.1 | — | — |
| Trial 3 (1 ml MTMS) | 94.1 | — | 91.8 | — | — |
| Trial 4 (0.5 ml MTMS) | 87.0 | — | — | — | — |

The results showed that the average WCA for the first trial was around 89.7°. A slight decline was observed with the reduction in concentration from substrate 1 to substrate 3, ranging between 90.8° to 90.1°. A higher drop in the WCA was noticed in substrate 4 to 87.4°. For the second trial, reducing the amount of MTMS to 2 ml generally improved the average WCA to 93.2°. There was no change in the WCA for the first two substrates and a noticeable improvement from 92.2° to 95.1° in the third substrate. In the third trial, the WCA was higher at the highest concentration in substrate 1. It was then reduced from 94.1° to 91.8° by reducing the concentration in the second substrate. The fourth trial showed an overall lowest WCA of 87°.

As shown in FIG. 15, the overall highest WCA was observed in the third substrate of the second trial with a WCA of 95.1°. However, the optimum result in this method was the highest in transmittance with the optimum WCA. This result can be seen in substrate MTMS_T2_S1, where the transmittance is 95% and the WCA is 92.2°.

As shown in FIG. 16, the SEM was used to determine the surface morphology of coated substrate. It gives a better understanding of the shape, size, and distribution of the fabricated nanoparticles on the substrate surface. Top-view images were taken at different magnifications.

FIG. 16 depicts a top-view SEM images of the coated substrate. The images were taken at ×1000 and ×20,000 magnification. Additionally, FIG. 16 depicts the nanoparticles distribution on the substrate surface. Also, the fabricated silica nanoparticles were different in shape and less than 500 nm in size.

As shown in FIG. 17, the topography of the surface was studied using the AFM. A 10×10 μm) three-dimensional scanned image was taken in the tapping mode of the surface. The surface roughness measurement was 9.552 nm.

The self-cleaning coating process, described in the Example herein, was based on fabricating a hydrophobic silica film using a coating prepared by the sol-gel process and deposited by the dip-coating method. The coating reactants were mixed in an isopropyl alcohol solvent containing Methyltrimethoxysilane as a precursor and hydrochloric acid as a catalyst. The solution concentration was adjusted by changing the amount of precursor in four trials and varying the amount of solvent in each trial. The optimum result was obtained for substrate MTMS_T2_S1. It showed around 95% transmittance and 92.2° contact angle. SEM images of nanoparticles were taken, and the surface roughness was measured to be 9.552 nm.

REFERENCES

E. Pattillo, Gary, "Fast Facts from the Inventory of U.S. Greenhouse Gas Emissions and Sinks: 1990-2017," *Coll. Res. Libr. News*, vol. 80, no. 5, p. 304, 2019, doi: 10.5860/crln.80.5.304.

ASHRAE, "Solar energy equipment," *Handbook*, 2016.

P. Wang et al., "Reducing the effect of dust deposition on the generating efficiency of solar PV modules by super-hydrophobic films," *Sol. Energy*, vol. 169, no. December 2017, pp. 277-283, 2018, doi: 10.1016/j.solener.2017.12.052.

A. A. M. Sayigh, "EFFECT OF DUST ON FLAT PLATE COLLECTORS," 1978, doi: 10.1016/b978-1-4832-8407-1.50190-2.

A. H. Hassan, U. A. Rahoma, and H. K. Elminir, "E a d c p p v m," pp. 24-36, 2005.

A. Mohammad Bagher, "Types of Solar Cells and Application," *Am. J. Opt. Photonics*, vol. 3, no. 5, p. 94, 2015, doi: 10.11648/j.ajop.20150305.17.

P. A. Patil, J. S. Bagi, and M. M. Wagh, "A Review on Cleaning Mechanism of Solar," 2017 *Int. Conf. Energy, Commun. Data Anal. Soft Comput.*, pp. 250-256, 2017, doi: 10.1109/ICECDS.2017.8389895.

A. Syafiq, A. K. Pandey, N. N. Adzman, and N. A. Rahim, "Advances in approaches and methods for self-cleaning of solar photovoltaic panels," *Sol. Energy*, vol. 162, no. May 2017, pp. 597-619, 2018, doi: 10.1016/j.solener.2017.12.023.

M. N. Horenstein, M. K. Mazumder, R. C. Sumner, J. Stark, T. Abuhamed, and R. Boxman, "Modeling of trajectories in an electrodynamic screen for obtaining maximum particle removal efficiency," *IEEE Trans. Ind. Appl.*, vol. 49, no. 2, pp. 707-713, 2013, doi: 10.1109/TIA.2013.2244192.

J. Adams et al., "Lunar dust degradation effects and removal/prevention concepts," vol. 2, 1967.

S. Banerjee, D. D. Dionysiou, and S. C. Pillai, "Self-cleaning applications of $TiO_2$ by photo-induced hydrophilicity and photocatalysis," *Appl. Catal. B Environ.*, vol. 176-177, pp. 396-428, 2015, doi: 10.1016/j.apcatb.2015.03.058.

B. Shaoxian and W. Shizhu, "Vapor-condensed gas lubrication of face seals," *Gas Thermohydrodynamic Lubr. Seals*, pp. 143-165, 2019, doi: 10.1016/b978-0-12-816716-8.00007-3.

R. N. Wenzel, "Surface roughness and contact angle," *J. Phys. Colloid Chem.*, vol. 53, no. 9, pp. 1466-1467, 1949, doi: 10.1021/j150474a015.

L. Wu and J. Baghdachi, *Functional polymer coatings: Principles, methods, and applications*. 2015.

A. Fujishima and K. Honda, "Electrochemical photolysis of water at a semiconductor electrode," *Nature*, 1972, doi: 10.1038/238037a0.

M. Pelaez et al., "A review on the visible light active titanium dioxide photocatalysts for environmental applications," *Appl. Catal. B Environ.*, vol. 125, pp. 331-349, 2012, doi: 10.1016/j.apcatb.2012.05.036.

W. Zhao, W. Ma, C. Chen, J. Zhao, and Z. Shuai, "Efficient Degradation of Toxic Organic Pollutants with Ni2O3/TiO2-xBx under Visible Irradiation," *J. Am. Chem. Soc.*, vol. 126, no. 15, pp. 4782-4783, 2004, doi: 10.1021/ja0396753.

S. Banerjee, S. C. Pillai, P. Falaras, K. E. O'shea, J. A. Byrne, and D. D. Dionysiou, "New insights into the mechanism of visible light photocatalysis," *J. Phys. Chem. Lett.*, vol. 5, no. 15, pp. 2543-2554, 2014, doi: 10.1021/jz501030x.

F. Pacheco-Torgal, J. A. Labrincha, M. V. Diamanti, C. P. Yu, and H. K. Lee, *Biotechnologies and biomimetics for civil engineering*. 2015.

W. Rong et al., "Light-induced amphiphilic surfaces," *Nature*, vol. 338, pp. 431-432, 1997.

S. Nishimoto and B. Bhushan, "Bioinspired self-cleaning surfaces with superhydrophobicity, superoleophobicity, and superhydrophilicity," *RSC Adv.*, vol. 3, no. 3, pp. 671-690, 2013, doi: 10.1039/c2ra21260a.

B. Bhushan and Y. C. Jung, "Natural and biomimetic artificial surfaces for superhydrophobicity, self-cleaning, low adhesion, and drag reduction," *Prog. Mater. Sci.*, vol. 56, no. 1, pp. 1-108, 2011, doi: 10.1016/j.pmatsci.2010.04.003.

U. Mehmood, F. A. Al-Sulaiman, B. S. Yilbas, B. Salhi, S. H. A. Ahmed, and M. K. Hossain, "Superhydrophobic surfaces with antireflection properties for solar applications: A critical review," *Sol. Energy Mater. Sol. Cells*, vol. 157, pp. 604-623, 2016, doi: 10.1016/j.solmat.2016.07.038.

L. Zhang, N. Zhao, and J. Xu, "Fabrication and application of superhydrophilic surfaces: A review," *J. Adhes. Sci. Technol.*, vol. 28, no. 8-9, pp. 769-790, 2014, doi: 10.1080/01694243.2012.697714.

H. M. Shang, Y. Wang, S. J. Limmer, T. P. Chou, K. Takahashi, and G. Z. Cao, "Optically transparent superhydrophobic silica-based films," *Thin Solid Films*, vol. 472, no. 1-2, pp. 37-43, 2005, doi: 10.1016/j.tsf.2004.06.087.

A. V. Rao et al., "Water repellent porous silica films by sol-gel dip coating method," *J. Colloid Interface Sci.*, vol. 352, no. 1, pp. 30-35, 2010, doi: 10.1016/j.jcis.2010.08.003.

Y. Zhao, M. Li, Q. Lu, and Z. Shi, "Superhydrophobic polyimide films with a hierarchical topography: Combined replica molding and layer-by-layer assembly," *Langmuir*, vol. 24, no. 21, pp. 12651-12657, 2008, doi: 10.1021/la8024364.

Y. Li, F. Liu, and J. Sun, "A facile layer-by-layer deposition process for the fabrication of highly transparent superhydrophobic coatings," *Chem. Commun.*, no. 19, pp. 2730-2732, 2009, doi: 10.1039/b900804g.

S. Amigoni, E. T. Givenchy De, M. Dufay, and F. Guittard, "Covalent layer-by-layer assembled superhydrophobic organic-inorganic hybrid films," *Langmuir*, vol. 25, no. 18, pp. 11073-11077, 2009, doi: 10.1021/la901369f.

L. Gang, "Superhydrophobicity of post-like aligned carbon nanotube films," *Sixth Int. Symp. Precis. Eng. Meas. Instrum.*, vol. 7544, no. December 2010, p. 754465, 2010, doi: 10.1117/12.885273.

B. Bhushan and Y. Chae Jung, "Wetting study of patterned surfaces for superhydrophobicity," *Ultramicroscopy*, vol. 107, no. 10-11, pp. 1033-1041, 2007, doi: 10.1016/j.ultramic.2007.05.002.

J. Y. Shiu, C. W. Kuo, P. Chen, and C. Y. Mou, "Fabrication of Tunable Superhydrophobic Surfaces by Nanosphere Lithography," *Chem. Mater.*, vol. 16, no. 4, pp. 561-564, 2004, doi: 10.1021/cm034696h.

G. Grundmeier, P. Thiemann, J. Carpentier, N. Shirtcliffe, and M. Stratmann, "Tailoring of the morphology and chemical composition of thin organosilane microwave plasma polymer layers on metal substrates," *Thin Solid Films*, vol. 446, no. 1, pp. 61-71, 2004, doi: 10.1016/j.tsf.2003.09.043.

Z. Yuan et al., "Facile method to prepare a novel honeycomb-like superhydrophobic Polydimethylsiloxan surface," *Surf. Coatings Technol.*, vol. 205, no. 7, pp. 1947-1952, 2010, doi: 10.1016/j.surfcoat.2010.08.085.

T. Choi, J. S. Kim, and J. H. Kim, "Transparent nitrogen doped $TiO_2$/WO3 composite films for self-cleaning glass applications with improved photodegradation activity," *Adv. Powder Technol.*, vol. 27, no. 2, pp. 347-353, 2016, doi: 10.1016/j.apt.2016.01.005.

C. H. Kwon, J. H. Kim, I. S. Jung, H. Shin, and K. H. Yoon, "Preparation and characterization of TiO2-SiO2 nanocomposite thin films," *Ceram. Int.*, vol. 29, no. 8, pp. 851-856, 2003, doi: 10.1016/S0272-8842 (03) 00019-1.

D. N. Bui, S. Z. Kang, X. Li, and J. Mu, "Effect of Si doping on the photocatalytic activity and photoelectrochemical property of TiO2 nanoparticles," *Catal. Commun.*, vol. 13, no. 1, pp. 14-17, 2011, doi: 10.1016/j.catcom.2011.06.016.

B. P. Isaacoff and K. A. Brown, "Progress in Top-Down Control of Bottom-Up Assembly," *Nano Lett.*, vol. 17, no. 11, pp. 6508-6510, 2017, doi: 10.1021/acs.nanolett.7b04479.

H. K. Raut, V. A. Ganesh, A. S. Nair, and S. Ramakrishna, "Anti-reflective coatings: A critical, in-depth review," *Energy Environ. Sci.*, vol. 4, no. 10, pp. 3779-3804, 2011, doi: 10.1039/c1ee01297e.

A. Bake, N. Merah, A. Matin, M. Gondal, T. Qahtan, and N. Abu-Dheir, "Preparation of transparent and robust superhydrophobic surfaces for self-cleaning applications," *Prog. Org. Coatings*, vol. 122, no. May, pp. 170-179, 2018, doi: 10.1016/j.porgcoat.2018.05.018.

O. U. Nimittrakoolchai and S. Supothina, "Deposition of organic-based superhydrophobic films for anti-adhesion and self-cleaning applications," *J. Eur. Ceram. Soc.*, vol. 28, no. 5, pp. 947-952, 2008, doi: 10.1016/j.jeurceramsoc.2007.09.025.

H. Liu, L. Feng, J. Zhai, L. Jiang, and D. Zhu, "Reversible wettability of a chemical vapor deposition prepared ZnO film between superhydrophobicity and superhydrophilicity," *Langmuir*, vol. 20, no. 14, pp. 5659-5661, 2004, doi: 10.1021/la0362800.

K. S. Han, J. H. Shin, W. Y. Yoon, and H. Lee, "Enhanced performance of solar cells with anti-reflection layer fabricated by nano-imprint lithography," *Sol. Energy Mater. Sol. Cells*, vol. 95, no. 1, pp. 288-291, 2011, doi: 10.1016/j.solmat.2010.04.064.

K. S. Han, J. H. Shin, and H. Lee, "Enhanced transmittance of glass plates for solar cells using nano-imprint lithography," *Sol. Energy Mater. Sol. Cells*, vol. 94, no. 3, pp. 583-587, 2010, doi: 10.1016/j.solmat.2009.12.001.

S. Bhattacharya, A. Datta, J. M. Berg, and S. Gangopadhyay, "Studies on surface wettability of poly(dimethyl) siloxane (PDMS) and glass under oxygen-plasma treatment and correlation with bond strength," *J. Microelectromechanical Syst.*, vol. 14, no. 3, pp. 590-597, 2005, doi: 10.1109/JMEMS.2005.844746.

N. De Geyter and R. Morent, *Cold plasma surface modification of biodegradable polymer biomaterials*. Woodhead Publishing Limited, 2014.

W. Chen, A. Y. Fadeev, M. C. Hsieh, D. Öner, J. Youngblood, and T. J. McCarthy, "Ultrahydrophobic and ultralyophobic surfaces: some comments and examples," *Langmuir*, vol. 15, no. 10, pp. 3395-3399, 1999, doi: 10.1021/la990074s.

B. D. Washo, "HIGHLY NONWETTABLE SURFACES VIA PLASMA POLYMER VAPOR DEPOSITION," in *Organic Coatings and Applied Polymer Science Proceedings*, 1982.

M. Sun et al., "Artificial lotus leaf by nanocasting," *Langmuir*, vol. 21, no. 19, pp. 8978-8981, 2005, doi: 10.1021/la050316q.

T. Saison et al., "Replication of butterfly wing and natural lotus leaf nanostructures by nanoimprint on Silica Sol-gel films To cite this version: Replication of butterfly wing and natural lotus leaf nanostructures by nanoimprint on Silica Sol-gel films," 2010.

T. Dey and D. Naughton, "Cleaning and anti-reflective (AR) hydrophobic coating of glass surface: a review from materials science perspective," *J. Sol-Gel Sci. Technol.*, vol. 77, no. 1, pp. 1-27, 2016, doi: 10.1007/s10971-015-3879-x.

D. H. Flinn, D. A. Guzonas, and R. H. Yoon, "Characterization of silica surfaces hydrophobized by octadecyltrichlorosilane," *Colloids Surfaces A Physicochem. Eng. Asp.*, 1994, doi: 10.1016/0927-7757 (94) 80065-0.

A. Venkateswara Rao, S. S. Latthe, D. Y. Nadargi, H. Hirashima, and V. Ganesan, "Preparation of MTMS based transparent superhydrophobic silica films by sol-gel method," *J. Colloid Interface Sci.*, vol. 332, no. 2, pp. 484-490, 2009, doi: 10.1016/j.jcis.2009.01.012.

A. A. Issa and A. S. Luyt, "Kinetics of alkoxysilanes and organoalkoxysilanes polymerization: A review," *Polymers (Basel)*, vol. 11, no. 3, 2019, doi: 10.3390/polym11030537.

Y. Han, D. Mayer, A. Offenhäusser, and S. Ingebrandt, "Surface activation of thin silicon oxides by wet cleaning and silanization," *Thin Solid Films*, vol. 510, no. 1-2, pp. 175-180, 2006, doi: 10.1016/j.tsf.2005.11.048.

T. Yamamoto, M. Okubo, N. Imai, and Y. Mori, "Improvement on Hydrophilic and Hydrophobic Properties of Glass Surface Treated by Nonthermal Plasma Induced by Silent Corona Discharge," *Plasma Chem. Plasma Process.*, vol. 24, no. 1, pp. 1-12, 2004, doi: doi.org/10.1023/B:PCPP.0000004878.61688.4d.

All referenced publications are incorporated herein by reference in their entirety, to the same extent as if each were incorporated by reference individually. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

The invention claimed is:

1. A method of synthesizing a self-cleaning coating of a substrate, the method comprising:

disposing a substrate in a colloidal $TiO_2$ solution, wherein the substrate has at least one $TiO_2$ nanoparticle disposed upon at least one surface of the substrate;

exposing the substrate having at least one $TiO_2$ nanoparticle disposed upon the at least one surface of the substrate to a light treatment, whereby the at least one surface of the substrate undergoes a photocatalytic reaction, thereby removing at least one impairment from the at least one surface of the substrate;

cleansing the substrate, wherein the at least one $TiO_2$ nanoparticle is removed from the at least one surface of the substrate;

introducing at least one silica precursor into an additional solution comprising at least one water molecule in a non-neutral pH medium;

hydrolyzing the at least one silica precursor, via collision with the at least one water molecule in the non-neutral pH medium, forming at least one non-methylated silica precursor having at least one silanol group;

condensing the at least one silanol group of the non-methylated silica precursor, wherein at least one silsesquioxane compound having at least one siloxane bond is formed;

curing the at least one silsesquioxane compound; and incorporating the at least one silsesquioxane compound on the at least one surface of the substrate.

2. The method of claim 1, wherein heat treatment is used to cure the silsesquioxane compound to the substrate.

3. The method of claim 1, wherein sonication is used to hydrolyze the at least one silica precursor.

4. The method of claim 1, wherein the silsesquioxane compound is hydrophobic.

5. The method of claim 1, further comprising the step of, after hydrolyzing the at least one silica precursor, introducing additional non-neutral pH medium, whereby a predetermined ratio of a total amount of silica precursor to a total amount of non-neutral pH medium is reached.

* * * * *